(12) United States Patent
Hoen et al.

(10) Patent No.: US 7,372,025 B2
(45) Date of Patent: May 13, 2008

(54) SCANNING PROBE MICROSCOPE USING A SURFACE DRIVE ACTUATOR TO POSITION THE SCANNING TIP

(75) Inventors: Storrs T. Hoen, Brisbane, CA (US); John M. Neil, Los Altos, CA (US)

(73) Assignee: Agilent Technologies, Inc, Santa Clara, CA (US)

( * ) Notice: Subject to any disclaimer, the term of this patent is extended or adjusted under 35 U.S.C. 154(b) by 226 days.

(21) Appl. No.: 11/291,671

(22) Filed: Nov. 30, 2005

(65) Prior Publication Data

US 2006/0097163 A1    May 11, 2006

(51) Int. Cl.
  *G01N 23/00*    (2006.01)
  *G21K 7/00*    (2006.01)

(52) U.S. Cl. ............ 250/306; 250/307; 250/310; 250/311; 250/309; 369/126; 369/101; 369/44.28; 310/309

(58) Field of Classification Search ........ 250/306, 250/307, 310, 311, 309; 369/126, 101, 44.28; 310/309
See application file for complete search history.

(56) References Cited

U.S. PATENT DOCUMENTS 5,751,683 A * 5/1998 Kley .................... 369/126

5,801,472 A    9/1998 Wada et al.

FOREIGN PATENT DOCUMENTS

EP    0 865 151 A2    9/1998

\* cited by examiner

*Primary Examiner*—Jack Berman
*Assistant Examiner*—Meenakshi S Sahu

(57) ABSTRACT

A scanning probe microscope includes a scanning probe tip and an electrostatic surface actuator operatively coupled to the scanning probe tip. The electrostatic surface actuator includes a movable member that has a first surface with a first plurality of electrodes disposed on the first surface and a stationary member that has a second surface with a second plurality of electrodes disposed on the second surface. The first and second surfaces are disposed in a confronting relationship The movable and stationary members are resiliently coupled so that the movable member is capable of being displaced with respect to the stationary member. The first and second pluralities of electrodes are configured to generate electrostatic forces in response to voltages applied. The electrostatic forces laterally displace the movable member in the direction generally parallel to the first and second surfaces. The scanning probe tip is controllably positioned by displacement of the movable member.

24 Claims, 16 Drawing Sheets

SCANNING PROBE MICROSCOPE USING A SURFACE DRIVE ACTUATOR TO POSITION THE SCANNING TIP

The priority benefit of the Jun. 11, 2003 filing date of the U.S. Provisional Patent Application Ser. No. 60/477,334. titled "A Scanning Probe Microscope Using A Surface Drive Actuator To Position The Scanning Tip", is hereby claimed.

BACKGROUND OF THE INVENTION

1. Field of the Invention

The present invention relates to a scanning probe microscope. In particular, the invention relates to an electrostatic surface actuator operatively coupled to a scanning probe tip of the scanning probe microscope.

2. Description of Related Art

Scanning probe microscopes are known. For example, U.S. Pat. No. 4,724,318 to Binnig describes a method of imaging the surface of objects with atomic resolution. U.S. Pat. No. 6,005,251 to Alexander et al. describes a voice coil scanner for a scanning probe microscope, and U.S. Pat. No. 6,323,483 to Cleveland et al. describes a piezoelectric scanner for a scanning probe microscope. Known scanning probe microscopes use piezoelectric actuators to position the probe tip over the test surface, and such actuators transform the applied voltage into a displacement and are useful for ranges of motions from 100 µm down to 0.1 nm. Unfortunately, these piezoelectric actuators have limitations due to creep and resonant frequencies. When a voltage is applied, a piezoelectric actuator displaces to a corresponding position. The piezoelectric material "relaxes" at that position. When a second voltage is applied, the position corresponding to the second voltage exhibits a "memory" corresponding to the position when the initial voltage had been applied. This is referred to as hysteresis. The position of the piezoelectric actuator depends on the history of the applied voltage.

When scanning a probe over a surface, the scan speed is limited by several factors such as tip wear, sample abrasion, cantilever response time, detector sensitivity, software acquisition times, external vibrations, available scanning speed, and the acceleration available to accelerate the tip normal to the surface, among others. Much progress has been made in many of these areas. For example, a research group demonstrated high frequency tips for data storage applications. See Reid et al. (*5 MHz, 2N/m Piezoresistive Cantilevers with INCISIVE tips*, 1997 International Conference on Solid State Sensors and Actuators, Chicago June 1997, pp. 447-450). However, the acceleration available to accelerate the tip is still extremely limited, being on the order of only several times the acceleration of gravity (g) for conventional scanning probes.

When the piezoelectric actuator is used to displace a scanning microscope probe tip, the scan speed is limited. Operating at higher scan speeds results in the probe tip being driven more by mechanical resonance of the piezoelectric actuator than by the applied voltage. This limits the scan rate achievable with the piezoelectric actuator.

The large mass of the piezoelectric actuator has a compounding effect when several actuation stages are stacked on each other. For some scanning probe microscopes, it is desirable to mount the z-actuator on an x-y stage. The large mass of the z actuator reduces the scan speed that the x-y stage can produce. The large mass of the z-actuator also implies that a large inverse reaction force is applied to the x-y stage when the probe is accelerated. Although Cleveland et al. (U.S. Pat. No. 6,323,483) and Bartzke et al. (U.S. Pat. No. 5,524,354) disclose a balanced piezoelectric actuator to reduce the inverse reaction force in which two parts of the actuator move in opposite directions, if applied to a z actuator of a scanning probe microscope, the use of a balanced piezoelectric actuator in this role would double the size and mass of the z actuator, further reducing the scanning speed that the x-y stage can provide. Furthermore, control of such actuators can be difficult and renders the overall scanning probe microscope more complex.

Some attempts have been made to couple a scanning probe to a micromachined actuator. One approach proposed using a torsional micromachined element to allow fast out-of-plane positioning of either an AFM or STM tip. See Miller et al. (*Scaling Torsional Cantilevers for Scanning Probe Microscope Arrays: Theory and Experiment*, 1997 International Conference on Solid State Sensors and Actuators, Chicago June 1997, pp. 455-458). At present, scanning probe microscopes use many possible tips. As yet no group has demonstrated a micromachined structure that is capable of scanning standard tips. cl SUMMARY OF THE INVENTION The invention improves the state of the art by providing an electrostatic surface actuator operatively coupled to a scanning probe tip. The electrostatic surface actuator positions and drives the scanning probe tip over the test surface.

This and other improvements are realized in a scanning probe microscope that includes a scanning probe tip and an electrostatic surface actuator operatively coupled to the scanning probe tip. The electrostatic surface actuator includes a movable member that has a first surface with a first plurality of electrodes disposed on the first surface and a stationary member that has a second surface with a second plurality of electrodes disposed on the second surface. The movable member is resiliently coupled to the stationary member so that the first and second surfaces are disposed in a confronting relationship and so that the movable member is capable of being displaced with respect to the stationary member in a first direction. The first and second pluralities of electrodes are configured to generate electrostatic forces in response to voltages applied to the first and second plurality of electrodes, the electrostatic forces being aligned to laterally displace the movable member in the first direction generally parallel to the first and second surfaces. The movable member is mechanically attached to the scanning probe tip such that the scanning probe tip is controllably positioned by displacement of the movable member.

This and other improvements are alternatively realized with a method of scanning a sample using a surface electrostatic actuator and this method includes mounting, displacing and sensing. The mounting mounts a probe on a movable member of the surface electrostatic actuator. A surface of the movable member is generally disposed to face a surface of a stationary member of the surface electrostatic actuator. The displacing displaces the movable member relative to the stationary member in a direction generally parallel to the surface of the movable member to scan the probe over the sample. The sensing senses a property of the probe that is responsive to the scan of the probe over the sample.

BRIEF DESCRIPTION OF DRAWINGS

The invention will be described in detail in the following description of preferred embodiments with reference to the following figures.

DETAILED DESCRIPTION OF PREFERRED EMBODIMENTS

The inventor of the present application has concluded that a key limiting factor is the mass of the piezoelectric or magnetic actuator conventionally used to position the tip normal to the sample surface. While the cantilever and the probe tip may have a combined mass of only a few nanograms, the actuator used to position the probe tip has a mass of tens to hundreds of grams. Clearly, in positioning and accelerating the probe, most of the generated force is used to accelerate the actuator itself. It is desirable to have an actuator that more closely matches the mass of the tip.

The present invention forms a scanning probe microscope using an electrostatic surface actuator operatively coupled to a scanning probe tip. The scanning probe tip can be an atomic force microscope tip (AFM tip), a magnetic force microscope tip (MFM tip), a scanning tunneling microscope tip (STM tip), a scanning field emission tip (SFM tip), electric force microscope tip (EFM), a scanning thermal microscope tip, and a scanning near-field optical microscope tip (SNOM tip) or any other scanning probe tip. An electrostatic surface actuator provides a large area onto which a probe tip can be adhered. The electrostatic surface actuator can position and drive the scanning probe tip over a large range of motion (100 µm) across the test surface. Moreover, since the electrostatic surface actuator has a high resonant frequency, the probe tip can be moved extremely precisely and accurately at high scan rates.

Figure 1:
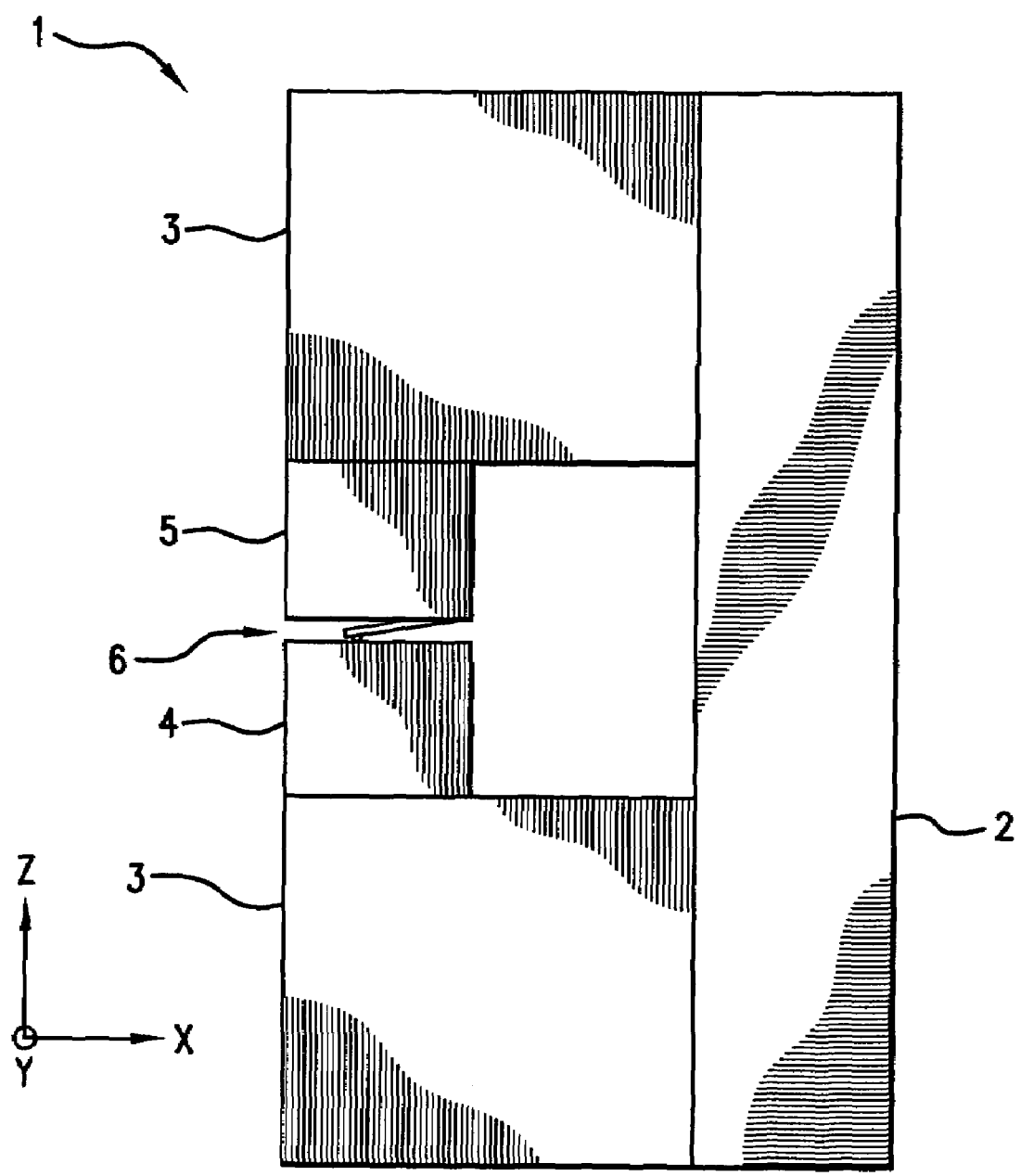
FIG. 1 is a section view of an exemplary microscope according to the invention.

FIG. 1 is a schematic section view of an exemplary scanning probe microscope 1 and its reference axes. Axes X, Y and Z provide three mutually orthogonal axes. Axis Z extends along the direction of movement of the translator of actuator 10 as discussed with respect to FIGS. 2-8. In FIG. 1, microscope 1 includes a base 2, two poles 3, a chuck assembly 4 onto which a sample to be measured is mounted, and a scanner 5 on to which the scanning probe 6 is mounted. The Z axis extends between the two poles 3 and through chuck assembly 4 and scanner 5. Other microscope arrangements (such as are described in U.S. Pat. No. 4,724,318 to Binnig, U.S. Pat. No. 6,005,251 to Alexander et al. and U.S. Pat. No. 6,323,483 to Cleveland et al.), incorporated herein by reference, are within the scope of the invention as discussed further herein. Furthermore, chuck assembly 4 may advantageously include an X, Y, Z adjustable stage for coarse positioning of the sample while scanner 5 executes fine positioning of the scanning probe in X, Y, Z axes. Alternatively, scanner 5 may advantageously include an X, Y, Z adjustable stage 29 (shown in FIG. 2) affixed to a pole for coarse positioning the fine adjustable scanner while chuck assembly 4 fixedly holds the sample. Alternatively, scanner 5 may advantageously include an X, Y adjustable stage affixed to a pole for course positioning the fine adjustable scanner while chuck assembly 4 fixedly holds the sample to an adjustable stage for course positioning of the sample in the Z direction (here defined to be along an axis between poles 3). Many different combinations of course adjustable stages and fine adjustable scanners, that are within the scope of the present invention, may be used in microscope 1.

Figure 2:
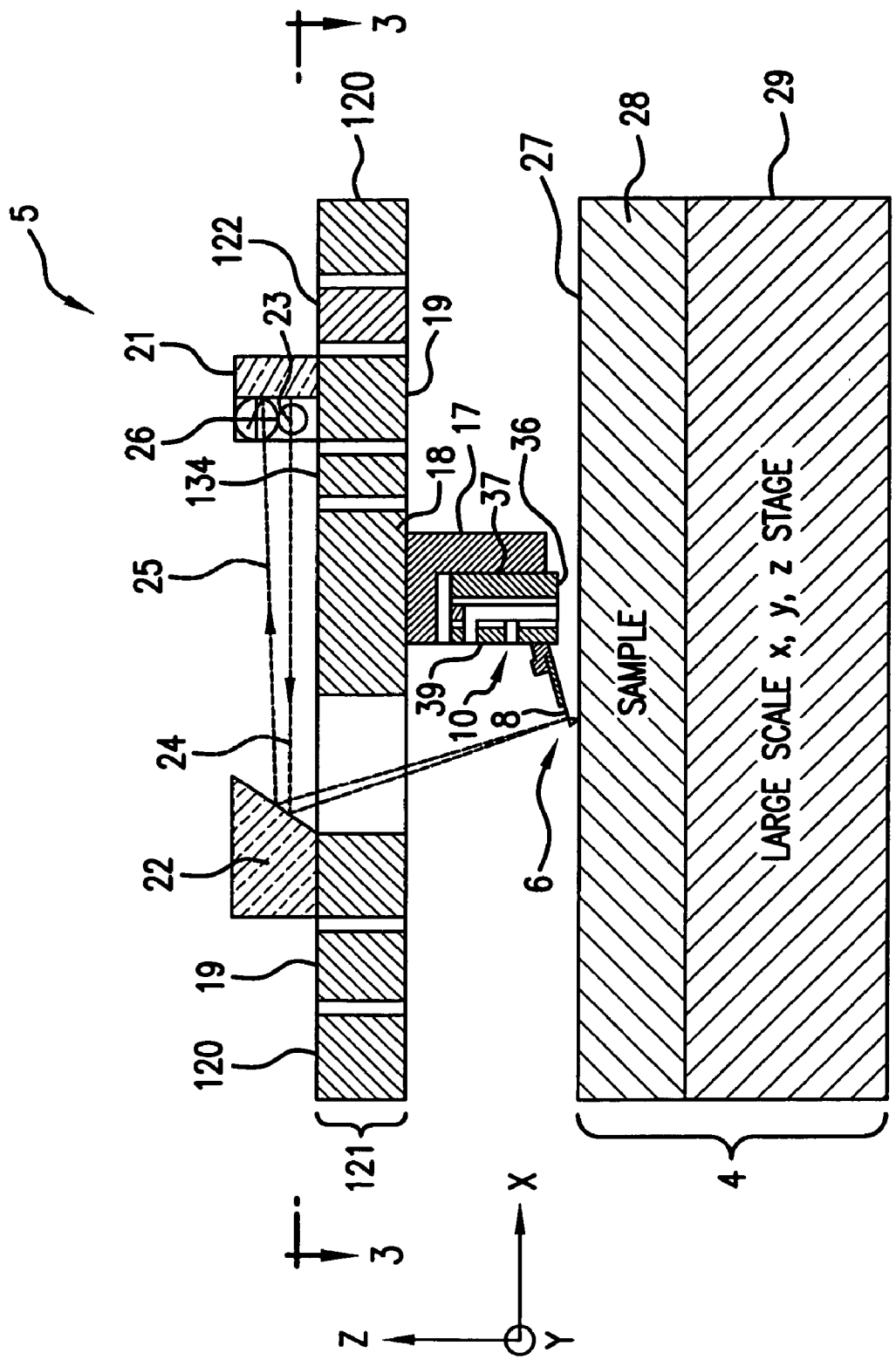
FIG. 2 is a section view of an exemplary scanner portion of a scanning probe microscope according to the invention.
Figure 3:
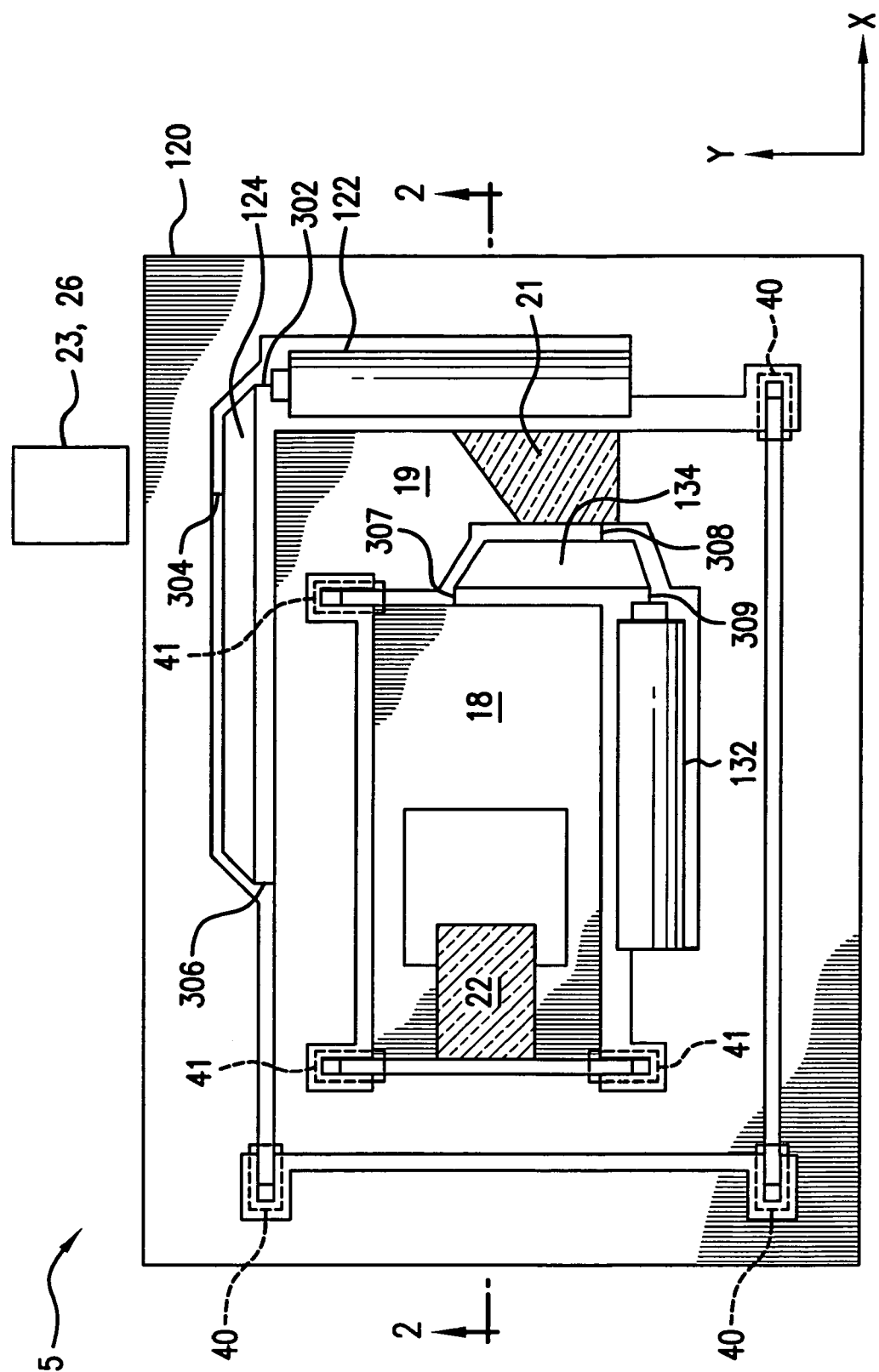
FIG. 3 is a top plan view of a piezoelectric x-y stage used to position a z actuator and probe tip in the scanning probe microscope shown in FIG. 2.

FIG. 2 is a section view, and FIG. 3 is a plan view, of a scanner 5 of the scanning probe microscope 1 according to one example of the present invention. In FIG. 2, scanner 5 of scanning probe microscope 1 includes the scanning probe 6 fixedly coupled to a fine scale Z actuator 10. Z actuator 10 is mounted to holding structure 17 with clamps or other means that fixedly hold a stationary surface of the Z actuator while allowing the free movement of the translating portion of the Z actuator. The clamps or other means that mount Z actuator 10 to holding structure 17 provide for electrical probe tips to contact electrical pads in a way that electrical signals are able to pass between holding structure 17 and actuator 10, or equivalent paths. Holding structure 17 is fixedly attached to a translator of a fine scale X actuator 18. The stator of the fine scale X actuator 18 is flexibly attached to the translator of the fine scale Y actuator 19. The stator of the fine scale Y actuator 19 is fixedly attached to rigid support 120. Fine scale X actuator 18, fine scale Y actuator 19 and rigid support 120 make a drive assembly 121. Although not shown in FIG. 2 or 3, electrical paths are provided to couple electrical signals from rigid support 120 to holding structure 17. Preferably, probe 6 is affixed to Z actuator 10 so that cantilever 8 (see FIG. 5) of probe 6 is disposed at a small angle with respect to the surface of a sample to be measured 27. The relative orientation of probe 6 and Z actuator 10 as well as the constituent parts of probe 6 are shown in more detail in FIG. 5. The small angle between cantilever 8 and the surface of the sample is for example, about 10 degrees, and provides clearance so that parts of probe tip 7) do not contact the surface 27 of sample 28 when the scanning probe microscope is in operation.

A measurement system is attached to scanner 5 of scanning probe microscope 1. This measurement system serves to detect and measure the deflections of cantilever 8. The measurement system includes a first folding mirror 21 fixedly attached to the translator of fine scale Y actuator 19 and a second folding mirror 22 fixedly attached to the translator of fine scale X actuator 18. The measurement system also includes a laser diode and collimator 23 and a quadrant photo detector 26 (both out of the plane of the section view of FIG. 2, see FIG. 3). Laser diode and collimator 23 forms and reflects a light beam off first folding mirror 21 as an incident light beam 24. Incident light beam 24 reflects off second folding mirror 22, and back off of a reflective surface of cantilever 8 (see FIG. 5) of scanning probe 6, and from there off second folding mirror 22 as reflected light beam 25. Reflected light beam 25 reflects off first folding mirror 21 into quadrant photo detector 26.

Other measurement systems are known and could be substituted for the measurement system described above. In particular, a piezoresistor can be incorporated into the base of the cantilever 8. Deflections of the cantilever would then cause changes in the resistance of the piezoresistor. Alternatively, an optical interferometer can be used to detect the position of the cantilever 8 relative to a reference surface. The position of the cantilever 8 could also be monitored by measuring the capacitance between cantilever 8 and a fixed surface. Other methods of measuring the position of cantilever 8 will be evident to one skilled in the art.

FIG. 3 is a plan view of a two-dimensional fine scale actuator of scanner 5 capable of translating along both the X and Y axes as depicted in a section view in FIG. 2. Depicted are folding mirrors 21, 22, laser, collimator and quadrant photo detector 23, 26. In FIG. 3, the two-dimensional fine scale actuator is a piezoelectric driven two-dimensional actuator.

Rigid structure 120 is fixedly coupled to one pole of the scanning probe microscope 1 (possibly through a large scale XY or XYZ or Z adjustable stage) while sample 27 is fixedly attached (possibly through an adjustable stage) to the other pole of the scanning probe microscope. The translator of the Y actuator 19 (on which folding mirror 21 is affixed) is flexibly coupled to rigid structure 120 through three main flexure structures 40 disposed roughly at three corners of the four corners of the translator of the Y actuator 19. These three flexure structures are structures similar to corresponding structures described in U.S. Pat. No. 6,215,222 to Hoen, titled Optical Cross-Connect Switch Using Electrostatic Surface Actuators, or equivalent. The translator of Y actuator 19 is coupled to a first end of a Y pivot arm 124 through a pivot flexure 306, and rigid structure 120 is coupled to a fulcrum of Y pivot arm 124 through another pivot flexure 304. Rigid structure 120 is fixedly attached to one end of a Y piezoelectric actuator 122, and the second end of Y pivot arm 124 is coupled through a pivot flexure 302 to the other end of Y piezoelectric actuator 122. The pivot flexures 302, 304, 306 accommodate modest rotational movement about axes normal to the XY plane, but are stiff to permit the piezoelectric actuator to push and pull on the second end of pivot arm 124 and permit first end of pivot arm 124 to push and pull on the translator of Y actuator 19.

The translator of Y actuator 19 serves as a rigid structure for the X actuator 18. The translator of X actuator 18 is flexibly coupled to the translator of Y actuator 19 through three main flexure structures 41 disposed roughly at three corners of the four corners of the translator of X actuator 18, and folding mirror 22 is affixed to the translator of X actuator 18. The three main flexure structures coupling the X translator to the Y translator are substantially the same design as the three main flexure structures coupling the Y translator to rigid structure 120. These three flexure structures are structures similar to corresponding structures described in U.S. Pat. No. 6,215,222 to Hoen or equivalent. The translator of X actuator 18 is coupled to piezoelectric actuator 132 in a way substantially the same as the translator of Y actuator 19 is coupled to piezoelectric actuator 122.

More specifically, the translator of X actuator 18 is coupled to a first end of an X pivot arm 134 through a pivot flexure, and the translator of Y actuator 19 is coupled to a fulcrum of X pivot arm 134 through another pivot flexure. The translator of Y actuator 19 is fixedly attached to one end of an X piezoelectric 132, and the second end of X pivot arm 134 is coupled through a pivot flexure to the other end of the X piezoelectric 132. These pivot flexures accommodate modest rotational movement about axes normal to the XY plane, but are stiff to permit the piezoelectric to push and pull on the second end of pivot arm 134 and permit the first end of pivot arm 134 to push and pull on the translator of X actuator 18.

As can be seen in FIG. 3, there are two main flexure structures 40 on one side of the fulcrum at 304 and only one main flexure structure 40 on the other side of the fulcrum at 304. For Y pivot arm 124, the position along the movable translator 19 of the pivot flexure 306 at the first end of pivot arm 124 is adjusted to balance the spring forces of the main flexure structures 40. This ensures smooth translation without rotation. When all main flexure structures provide equal spring forces, it will be necessary to position the pivot flexure 306 at the first end of the pivot arm 124 closer to end of the translator where two main flexure structures 40 are formed to ensure smooth translation without rotation. The X pivot arm 134 design is analogous to the Y pivot arm design. For each of the X and Y pivot arms, the positions of the pivot flexure at the fulcrums, for example at 304, are adjusted to provide motion amplitude multiplication or mechanical advantage as required. An arrangement providing amplitude multiplication is illustrated.

Many of the components of the two-dimensional fine scale actuator of scanner 5 shown in FIGS. 2 and 3 have the same thickness and can be made advantageously from a single plate of material. Common machining techniques such as wire electrical discharge machining (EDM) or laser machining can be used to form the X actuator 18, Y actuator 19, and their associated flexures 40, pivot arms and pivot flexures. Suitable materials for the scanner 5 include aluminum, high strength steel and other materials that have a large ratio between Youngs modulus and density. In operation, the X and Y scanner, depicted in FIGS. 2 and 3, scans holding structure 17 and actuator 10 over the sample 27. Actuator 10 adjusts to ensure that probe tip 7 is just in contact with the surface of sample 27 or just above the surface of sample 27 or is oscillating above the surface of sample 27 or is oscillating and contacting the surface of sample 27 or is in whatever other modality of scanning is required by the user. When probe tip 7 encounters a high spot on the surface of sample 27, cantilever 8 bends, and the reflective surface of cantilever 8 (on the opposite side from probe tip 7) reflects the reflected light beam 25 at a new angle in a first direction. Similarly, on irregular surfaces of sample, the cantilever can twist when the probe tip scans over the irregular surface and the light beam reflects in a second direction. The flexure of the cantilever, both bending and twisting, causes reflected light beam 25 to project on, and be detected by, quadrant photo detector 26 with an offset in the two directions proportional to the amount of bending and twisting.

As described above, probe tip 7 is scanned over sample 27; however, it is the relative motion between probe tip 7 and sample 27 that is required. Scanning probe 6 could be fixedly mounted and sample 27 could be mounted on actuator 10 so that sample 27 is scanned over probe tip 7. Such a scanning sample microscope would require a corresponding adjustment of the measuring system to measure deflection of cantilever 8.

Sample 27 is preferably mounted in a chuck on a stage movable in X, Y and Z directions to provide large scale movement and permit the X, Y and Z actuators to provide fine scanning movements. Here too, it is the relative motion between probe tip 7 and sample 27 that is required. Alternatively, a large scale X, Y, Z adjustable stage could be attached to the rigid structure 120 of the set of fine scale stages and provide large scale motion of the probe with respect to the sample.

A preferred actuator technology for this application is an electrostatic surface actuator. Electrostatic surface actuators themselves have been described in a number of patents. In particular, Higuchi et al., Electrostatic Actuator, U.S. Pat. No. 5,378,954, Hoen et al., Electrostatic Actuator with Alternating Voltage Patterns, U.S. Pat. No. 5,986,381, and Hoen, Optical Cross-Connect Switch Using Electrostatic Surface Actuators, U.S. Pat. No. 6,215,222, all incorporated herein by reference.

Figure 4:
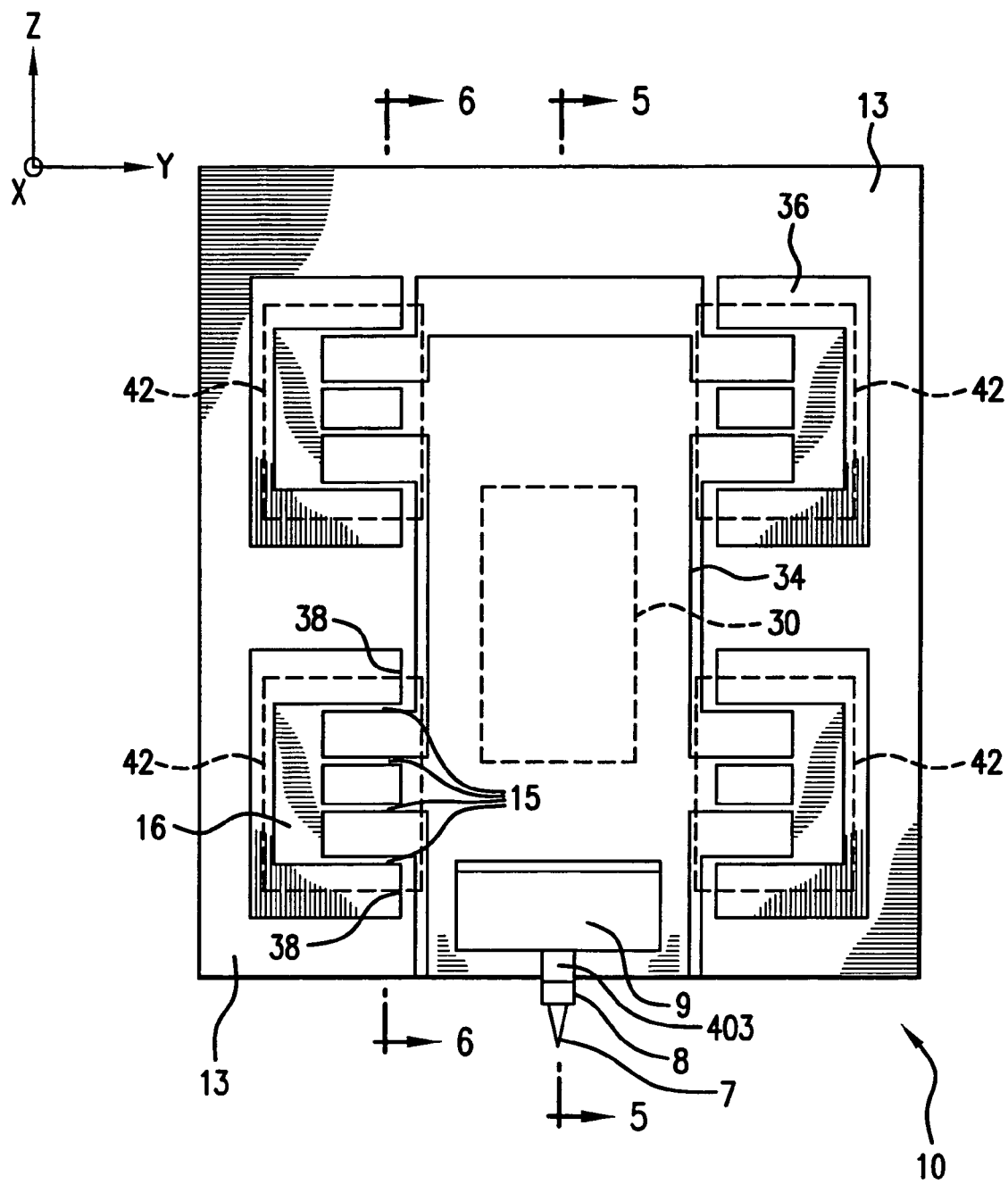
FIG. 4 is a top plan view of an electrostatic surface actuator as used in the present invention.
Figure 5:
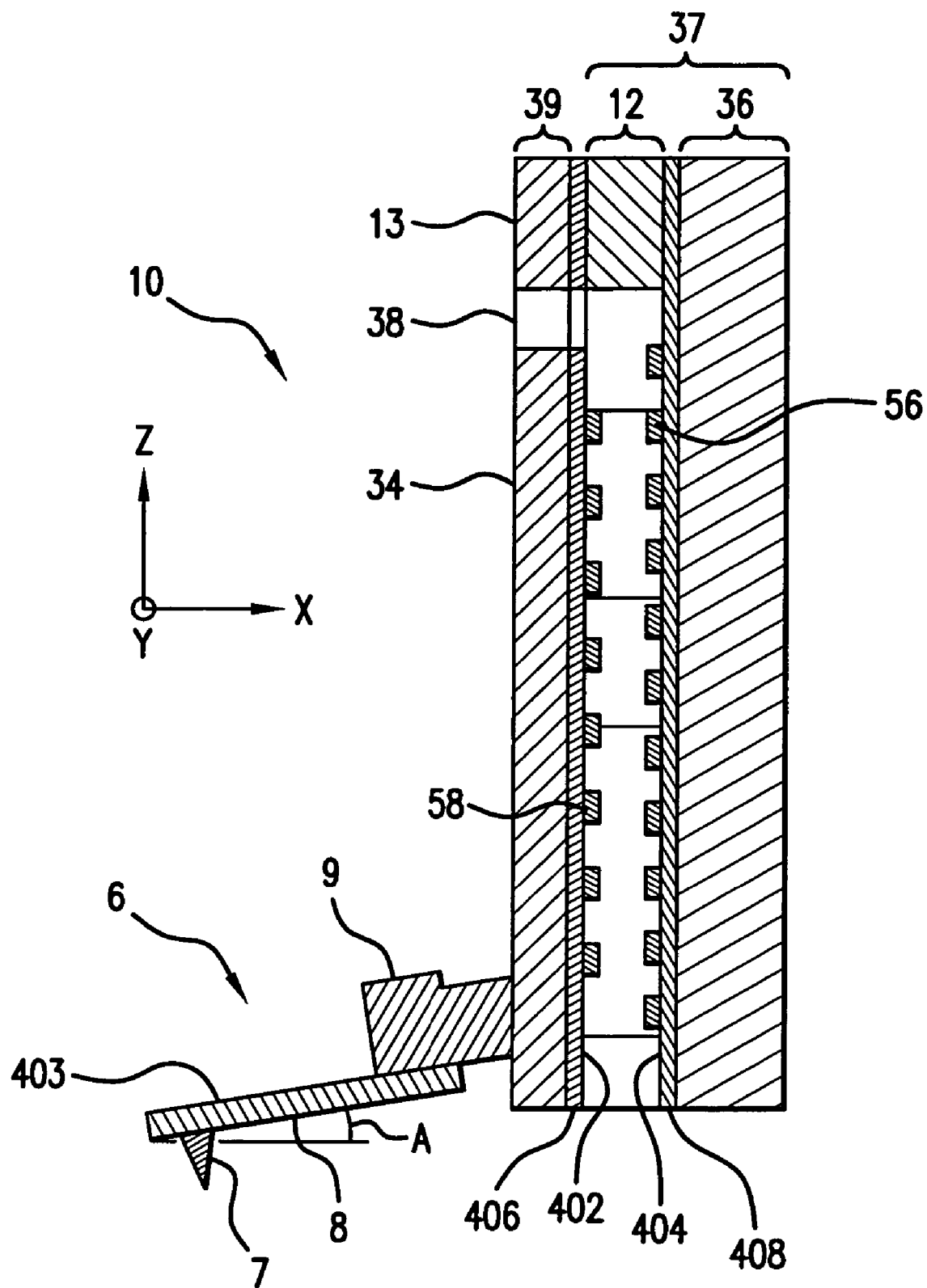
FIGS. 5 and 6 are section views through respective sections of the actuator of FIG. 4.
Figure 6:
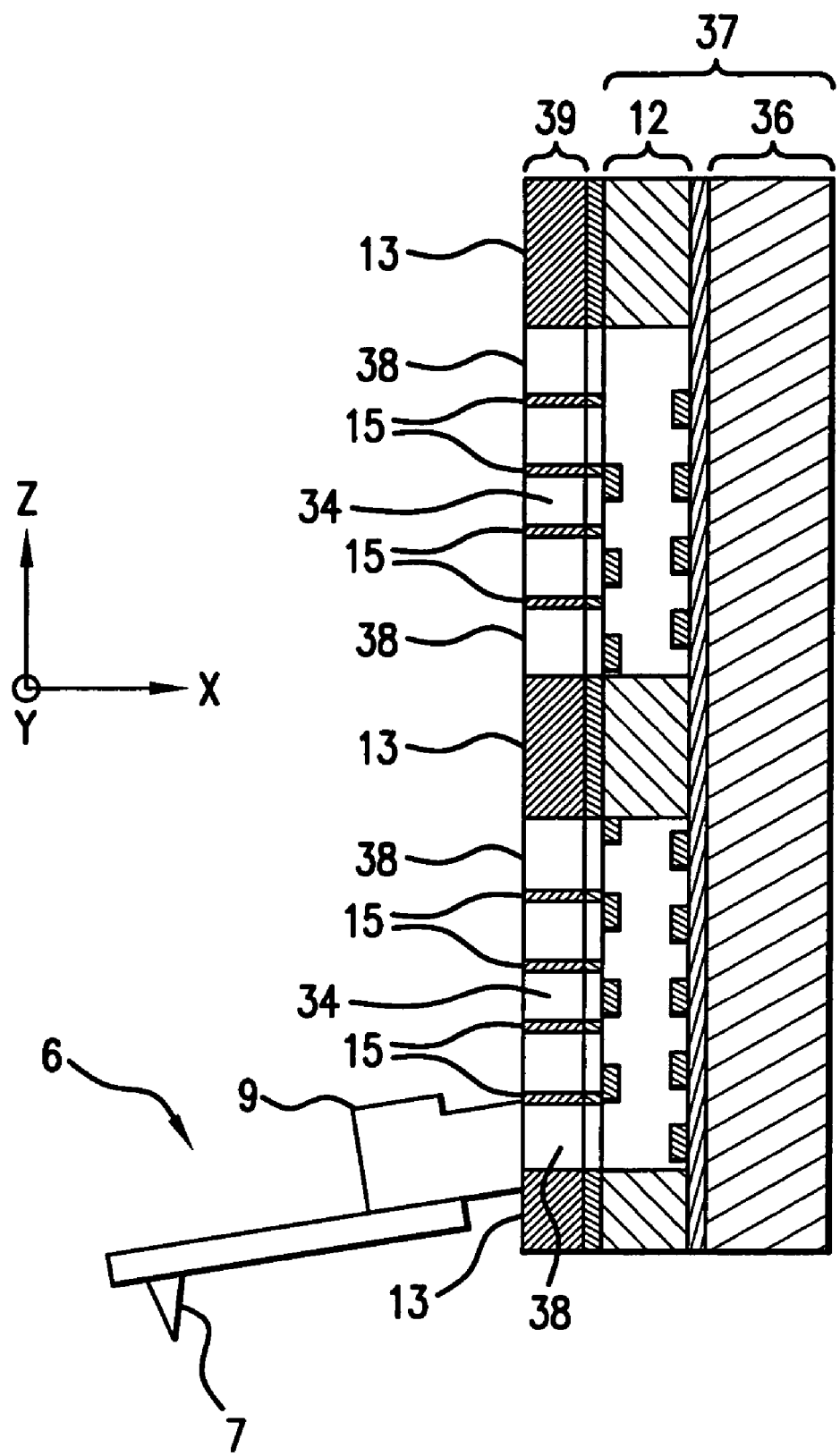
Figure 7:
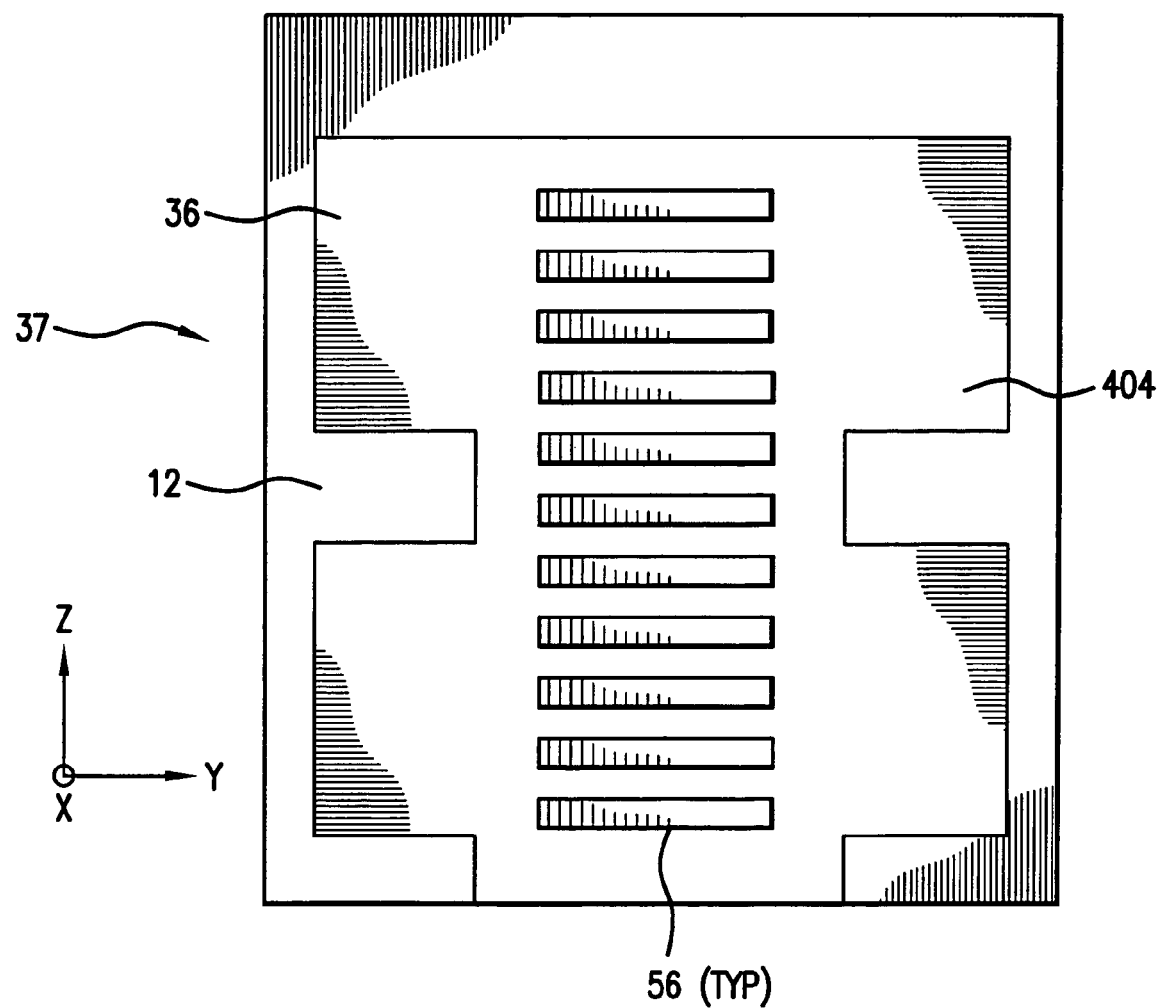
FIG. 7 is a top plan view of the stator portion of the actuator of FIG. 4.
Figure 8:
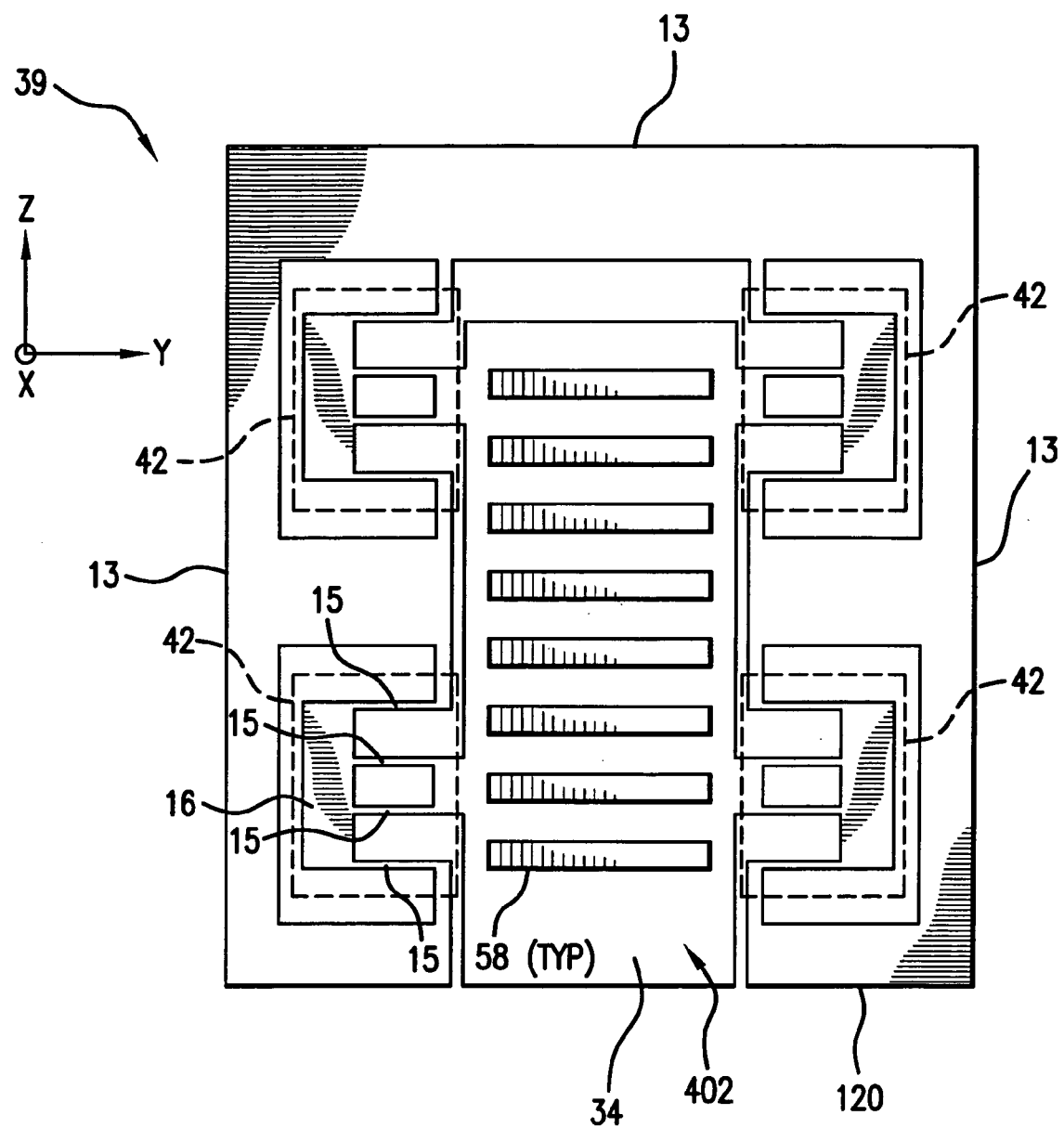
FIG. 8 is a reflected ceiling view (lower plan view) of the translator portion of the actuator of FIG. 4.

FIGS. 4-8 show details of an electrostatic surface actuator such as might be used as actuator 10 in FIGS. 2 and 3. FIG. 4 depicts a plan view of the actuator showing the location of section lines 5-5' and 6-6'. FIG. 5 depicts the view of the section through section line 5-5', and FIG. 6 depicts the view of the section through section line 6-6'. FIGS. 7 and 8 depict facing views of the stator and translator, respectively, of the electrostatic surface actuator.

In FIG. 4, translator 34 is shown overlaying stator 36. Translator 34 is flexibly coupled to stator 36 through four flexure structures 42, two flexure structures coupled on each side of translator 34. In the exemplary embodiment shown, each flexure structure 42 includes four individual flexures 15. Eight translator supports 38 are affixed to the upper surface of the stator. The four individual flexures 15 of each of the flexure structures 40 are integrally formed with translator 34. Two central flexures 15 of each flexure structure 42 are integrally affixed at a first end to translator 34 and at a second end to rigid floating element 16. Each of the two outside flexures 15 of each flexure structure 42 is attached at a first end to a corresponding one of the eight translator supports 38 and at a second end to rigid floating element 16. The flexure structures allow the translator to move in one preferred direction relative to the stator, and although small motions are possible in the other two orthogonal directions, such orthogonal displacement is minimal. As a more specific example, the flexures 15 may have a thickness of 2 μm and a depth of 100 μm.

Affixed to one end of the translator is scanning probe handle 9, cantilever 8 and probe tip 7. An alternative location on which to mount scanning probe 6 (e.g., scanning probe handle 9, cantilever 8 and probe tip 7) is mounting pad 30 on a top surface of the translator.

FIG. 5 shows a cross-section through section line 5-5' of electrostatic surface actuator 10 with a scanning probe 6 mounted on the actuator. Scanning probe 6 includes probe tip 7, cantilever 8 and handle 9. Handle 9 is called a "handle" since it is formed to be large enough to be able to be handled whereas cantilever 8 and probe tip 7 are of a size that is not easily handled. The surface 403 (also shown in FIG. 4) of cantilever 8 opposite probe tip 7 is reflective to work with the measurement system described with respect to FIGS. 2 and 3. It is possible, as in an alternative embodiment, to fabricate the cantilever and probe attached to the surface drive actuator without the handle.

Electrostatic surface actuator 10 is typically formed of a stator assembly 37 and a translator assembly 39. The stator assembly includes a stator 36, translator support 12 formed on an outer perimeter of stator 36 and stator electrodes 56 formed on a more central portion of stator 36. The stator electrodes are either formed on an insulating stator or formed on surface 404 of insulating layer 408 formed on the stator (collectively referred to as insulatively spaced from the stator). The translator assembly includes a rigid frame 13 fixedly attached to translator support 12, a translator 34, flexures 15 (see FIGS. 4 and 6) coupled between rigid frame 13 and translator 34, and translator electrodes 58 (collectively, translator and stator electrodes are called driving electrodes) formed on a surface of translator 34 to be in a confronting relationship with stator electrodes 56. The translator electrodes are either formed on an insulating translator or formed on surface 402 of insulating layer 406 formed on the translator (collectively referred to as insulatively spaced from the translator). Since rigid frame 13, flexures 15 and translator 16 are formed to be very thin, handle 14 is advantageously formed on rigid frame 13 and translator 34 to provide a stronger structure and something to hold on to, if needed, when the translator assembly is attached to the stator assembly. It is possible, as in an alternative embodiment, to fabricate the rigid frame 13, flexures 15 and translator 16 without handle 14. In general, rigid frame 13, translator 34, flexures 15, and floating post 16 are usually formed from a silicon wafer using common micromachining techniques. Similarly, the stator can be fabricated using conventional integrated circuit techniques on a silicon wafer.

As described in U.S. Pat. No. 5,986,381 to Hoen et al., or U.S. Pat. No. 6,215,222 to Hoen, changing the voltage on one of the stator electrodes steps the position to the translator. The translator can be moved in sub-nanometer sized steps, and in fact, moved in steps that are only a fractional part of a tenth of a nanometer. Because the translator sits in a steep potential well, the translator position is accurate and repeatable.

Translator 34 is a movable member that has a first surface, and stator 36 is a stationary member that has a second surface. The movable member includes first electrodes disposed on the first surface, and the stationary member includes second electrodes disposed on the second surface (shown in FIGS. 7 and 8) located on the opposing surfaces of the translator and the stator. The movable member is resiliently coupled to the stationary member so that the first and second surfaces are disposed in a confronting relationship and so that the movable member is capable of being displaced along the Z direction with respect to the stationary member.

When electrostatic surface actuator 10 is activated, the electrostatic forces created by applying voltages to the electrodes of the translator and the stator can be manipulated to laterally displace the translator with respect to the stator in the preferred direction. The displacement operation of the translator and the stator will be described below. The lateral movement of the translator moves the scanning probe tip that is adhered to translator 34 (e.g., an end of, or mounting pad 30 of, the translator 34).

FIG. 6 shows a view of the section through section line 6-6' of FIG. 4. FIG. 6 depicts stator 36 translator support 12, translator handle 14, rigid frame 13 and flexures 15. Translator 34 is out of the plane of the section depicted as FIG. 6 (see FIG. 4).

In FIGS. 7 and 8, two sets of drive electrodes, electrodes 58 of the translator and stator electrodes 56, are shown. The drive electrodes 58 are located on the bottom surface of the translator 34, while the drive electrodes 56 are located on the upper surface of the stator 36. These drive electrodes generate the electrostatic forces that will displace the translator 34 in the Z direction. The generation of the electrostatic forces by the drive electrodes will be described below. Each drive electrode is a thin strip of conductive material that is parallel to the other drive electrodes in the set.

In a preferred embodiment, a thin layer of insulating material is located between the translator electrodes and the translator 34. Similarly, another layer of insulating material is located between the stator electrodes and the stator 36. These insulating layers electrically isolate each electrode so that electrical charge on a particular electrode is not lost to another electrode via the stator or the translator. More specifically, a silicon oxide, silicon nitride, or aluminum nitride formed by plasma-enhanced chemical vapor deposition, sputter deposition, or low-pressure chemical vapor deposition is used to insulatively space the electrodes from the stator or translator. The stator or translator is generally formed from a slightly doped silicon wafer. The wafer can be either p or n doped.

FIG. 7 shows the surface of stator 36 that faces translator 34. FIG. 8 shows the surface of translator 34 that faces stator 36. The translator electrodes are positioned in a mirror image of the stator electrodes. Therefore, the translator electrodes are disposed facing the stator electrodes in actuator 10.

The electrostatic forces that laterally displace the translator 34 are generated by the translator electrodes and the stator electrodes. The electrostatic forces between the opposing electrodes are generated by applying different voltages to these electrodes. By varying the electrostatic forces between these drive electrodes, the translator 34 can be displaced in a predetermined direction. A repeat distance is defined by the distance between the center of a translator electrode held at a particular voltage and the center of the nearest translator electrode, respectively, held at approximately the same voltage. In a preferred embodiment, where every other translator electrode is held at the same voltage, the repeat distance is twice the center-to-center spacing of the translator electrodes, assuming that the spacing is constant. To ensure that the generated electrostatic forces will be optimal for laterally displacing the translator 34, it is desirable to keep the ratio of the repeat distance associated with the translator electrodes and the gap distance between the stator electrodes and the translator electrodes within a certain range. To minimize the forces in a direction transverse to the direction of movement in the one-dimensional actuator 10, it is desirable to keep the repeat distance divided by the distance between the stator electrodes and the translator electrodes below approximately sixteen.

There are numerous ways to apply the voltages to the drive electrodes to generate and vary the electrostatic forces. An exemplary way to generate and vary the electrostatic forces between the drive electrodes to displace the translator 34 will now be described with reference to FIGS. 9, 10 and 11.

Figure 9:
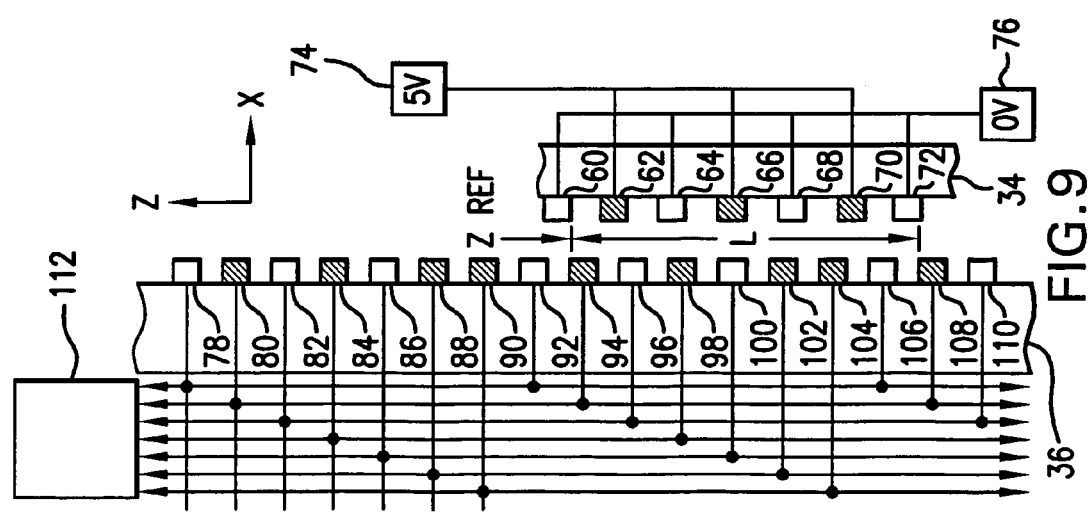

In FIG. 9, cross-sectional segments of the translator 34 and the stator 36 are shown. The translator is illustrated with a number of translator electrodes 60, 62, 64, 66, 68, 70 and 72 that are electrically coupled to either a voltage source 74 or a voltage source 76 in an alternating fashion. The voltage source 74 provides a constant predetermined voltage (of, for example, positive five volts, but may advantageously range from, for example, 3 volts to 100 volts) to the electrodes 62, 66 and 70, while the voltage source 76 provides a constant voltage (of, for example, zero volts, but may advantageously range from, for example, 10 V to −100V) to electrodes 60, 64, 68 and 72. The stator 36 is illustrated with a number of stator electrodes 78, 80, 82, 84, 86, 88, 90, 92, 94, 96, 98, 100, 102, 104, 106, 108 and 110 that are coupled to a controller 112. The controller 112 selectively provides either zero volts or a predetermined voltage (e.g., positive five volts) to the stator electrodes 78-110. The translator electrodes 60-72 are spaced such that approximately six translator electrodes are situated for a specific length L, while approximately seven stator electrodes are situated for the same length L. Since the stator will remain stationary as the translator is laterally displaced, the left edge of the stator electrode 94 will be designated as a reference point $X_{ref}$.

Figure 11:
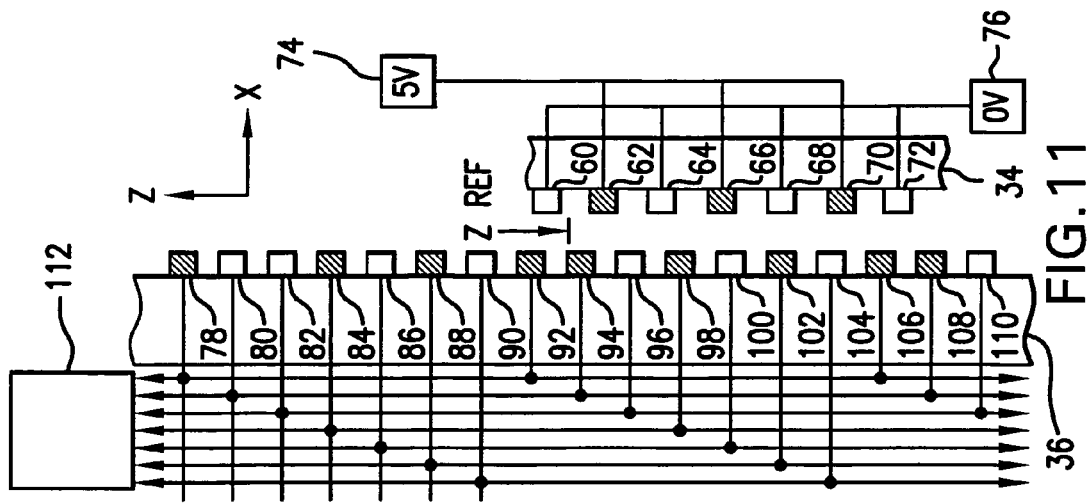
FIGS. 9, 10 and 11 are schematic section views of the actuator of FIG. 4 showing the operation of the drive electrodes.
Figure 10:
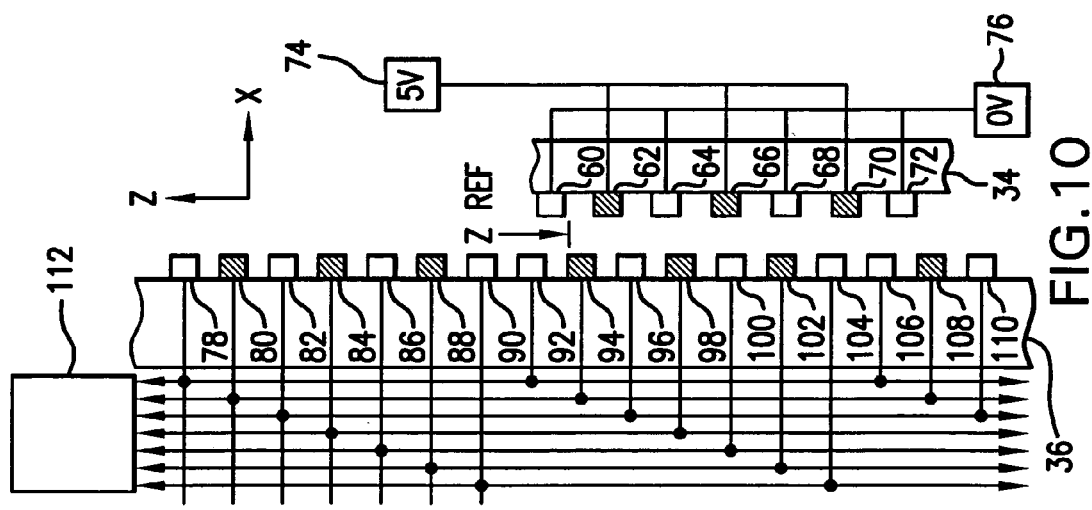

Initially, in one example, the controller 112 applies five volts to stator electrodes 76, 80, 84, 86, 90, 94, 98, 100 and 104, as shown in FIG. 9. The electrodes that are supplied with five volts have been cross-hatched to ease identification. To displace translator 34 in the preferred direction, i.e. to the left, every seventh stator electrode is switched from the original voltage of zero or five volts to the other voltage of zero or five volts by the controller 112. In this exemplary manner, the stator electrodes 90 and 104 have been switched from five volts to zero volts, as shown in FIG. 10. This change causes a net electrostatic force on the translator 34, which incrementally displaces the translator 34 in the preferred direction. Next, every seventh stator electrode 78, 92 and 106 that is just right of the stator electrodes 90 and 104 that were previously switched are switched to further displace the translator in the preferred direction. The stator electrodes 78, 92 and 106 are switched from zero volts to five volts by the controller 112. The resulting voltage pattern is shown in FIG. 11. Similar to the previous change, this change in the voltage pattern of the stator electrodes 78-110 incrementally displaces the translator in the preferred direction. By continually switching the voltages for every seventh stator electrode in this fashion, the translator is further moved in the preferred direction. However, there is a limit to the total displacement of the translator from its original position due to the fact that the translator is physically coupled to the stator 36 by the flexures 40 and the translator supports 38.

Returning to FIG. 9, it is possible to move the translator in smaller increments than that caused by the method described above. Instead of changing the voltage on electrodes 90 and 104 from five volts to zero volts, the voltage on these electrodes can be changed a fraction of five volts, causing the translator to move less than the increment shown between FIG. 9 and FIG. 10. Indeed, under many operating ranges, the position of the translator is linear with the voltage applied to the electrodes 90 and 104.

Other configurations of drive electrodes and applied voltages are possible for applying lateral forces to the movable translator 34. The method of applying voltages described above is directly extendable to groups of electrodes in which the first set of electrodes is composed of groups of 2n electrodes and the second set of electrodes is composed of groups of 2n±1 electrodes. Similar to the above method, a spatially alternating pattern of voltages is applied to the first set of electrodes and a spatially alternating pattern of voltages is applied to the second set of electrodes. Because the second set of electrodes consists of groups of an odd number of electrodes, two electrodes in each group have the same voltage as one of their nearest neighbors. Similar to the above method, movement of the translator is induced by switching the voltage on the electrodes that have the same voltage as their nearest neighbor.

Other electrostatic surface drives are also applicable to this invention. One example is described by Higuchi et al. in U.S. Pat. No. 5,448,124. In this case, the pitches of the first and second set of drive electrodes are similar and three-phase temporally alternating voltages are applied to both the first and second sets of drive electrodes. The position of the translator is controlled by varying the phase difference between the three phase signals applied to the first and second sets of electrodes.

Figure 12:
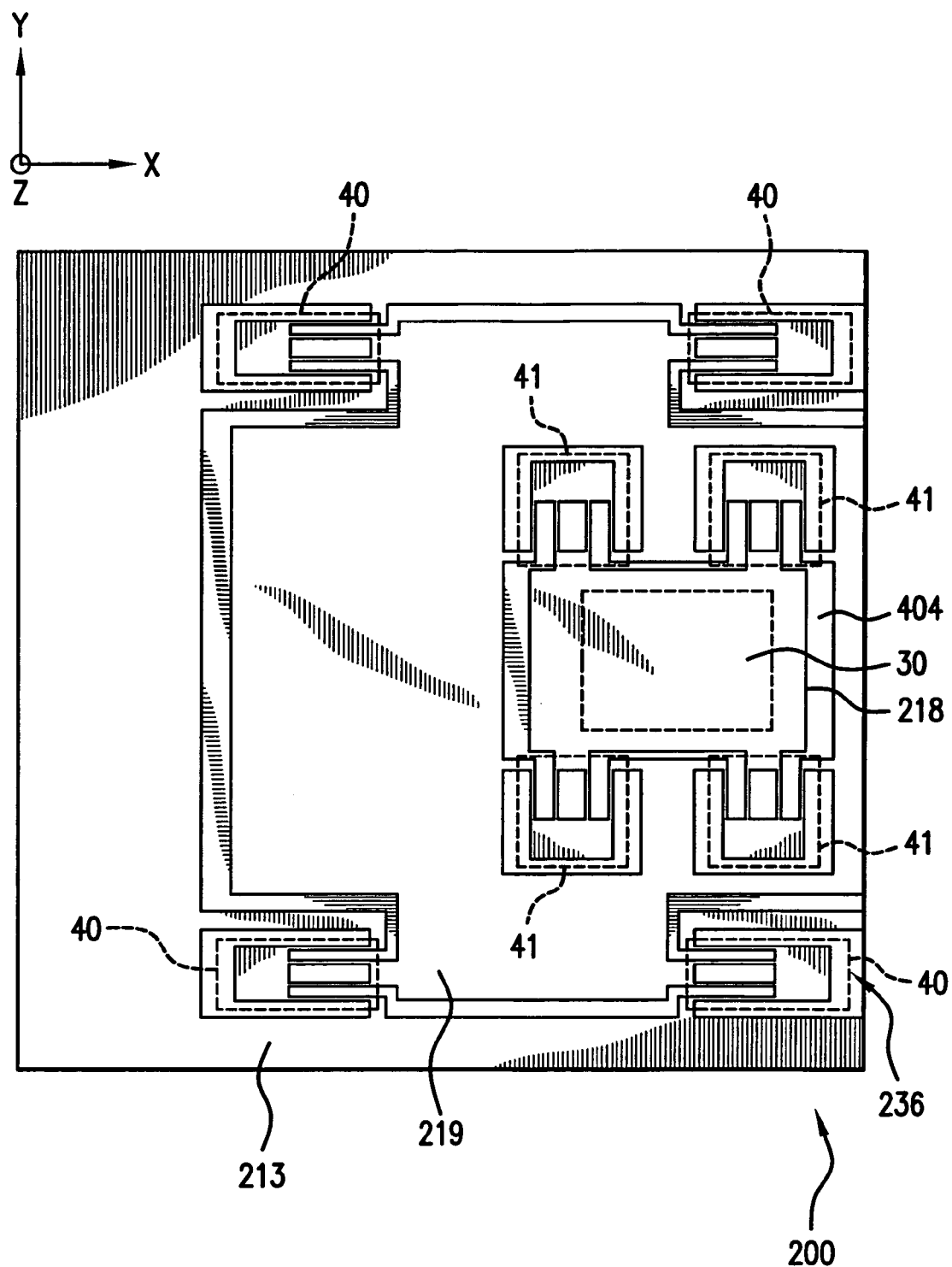
FIG. 12 is a top plan view of an exemplary two-dimensional actuator as used in the present invention.

FIG. 12 is a top plan view of an alternative embodiment of a two-dimensional fine scale actuator 200 capable of translating along both the X and Y axes with respect to stator 236. A two-dimensional electrostatic surface actuator may be used in the present invention. The two-dimensional electrostatic surface actuator is easily generalized in light of the description above of the one-dimensional actuator 10. In FIG. 12, rigid structure 213 is flexibly coupled to Y translator 219 through four main flexure structures 40 (substantially similar to the flexure structures discussed with respect to FIGS. 4 and 6). In the embodiment of FIG. 12, Y translator 219 is electrostatically driven along the Y axis with a drive mechanism similar to the drive mechanism discussed with respect to FIGS. 4-11. Then, Y translator 219 serves as a rigid structure to which X translator 218 is flexibly coupled through four main flexures (substantially similar to the flexures discussed with respect to FIGS. 4 and 6). In the embodiment of FIG. 12, X translator 218 is electrostatically driven along the X axis with a drive mechanism similar to the drive mechanism discussed with respect to FIGS. 4-11. For the same level of performance, the electrostatically driven XY translators 218, 219 of FIG. 12 tend to be lighter than the corresponding piezoelectrically driven XY translators 18, 19 of FIG. 3. The lighter translators have a faster slew rate and can therefore scan at a faster rate. Furthermore, the electrostatic surface actuators do not have the memory or creep problems of piezoelectric actuators where the position of the piezoelectric actuator depends on the history of the applied voltage.

Figure 13:
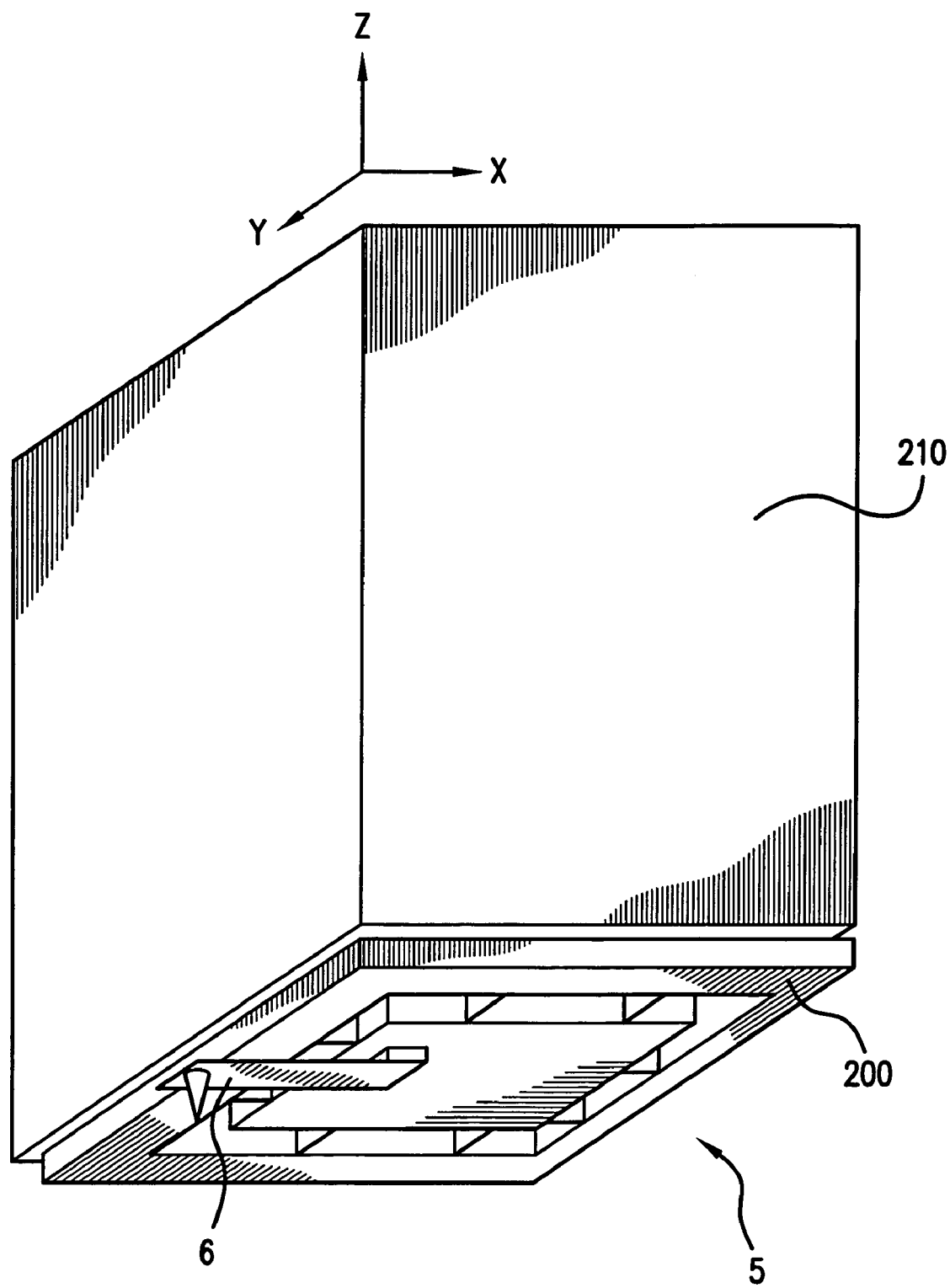
FIG. 13 is a perspective view of an alternative and exemplary scanner portion of a scanning probe microscope according to the invention.

In FIG. 13, scanner 5 (see FIG. 1 for the scanner's relationship to the microscope 1) includes linear piezoelectric actuator 210 and two-dimensional fine scale actuator 200 (see FIG. 12) shown schematically in FIG. 13 with scanning probe 6 attached to mounting pad 30 (see FIG. 12). Owing to the light weight and other properties of the electrostatic surface actuator 200, scanner 5 has improved scan rate performance over known similar scanners.

Figure 14:
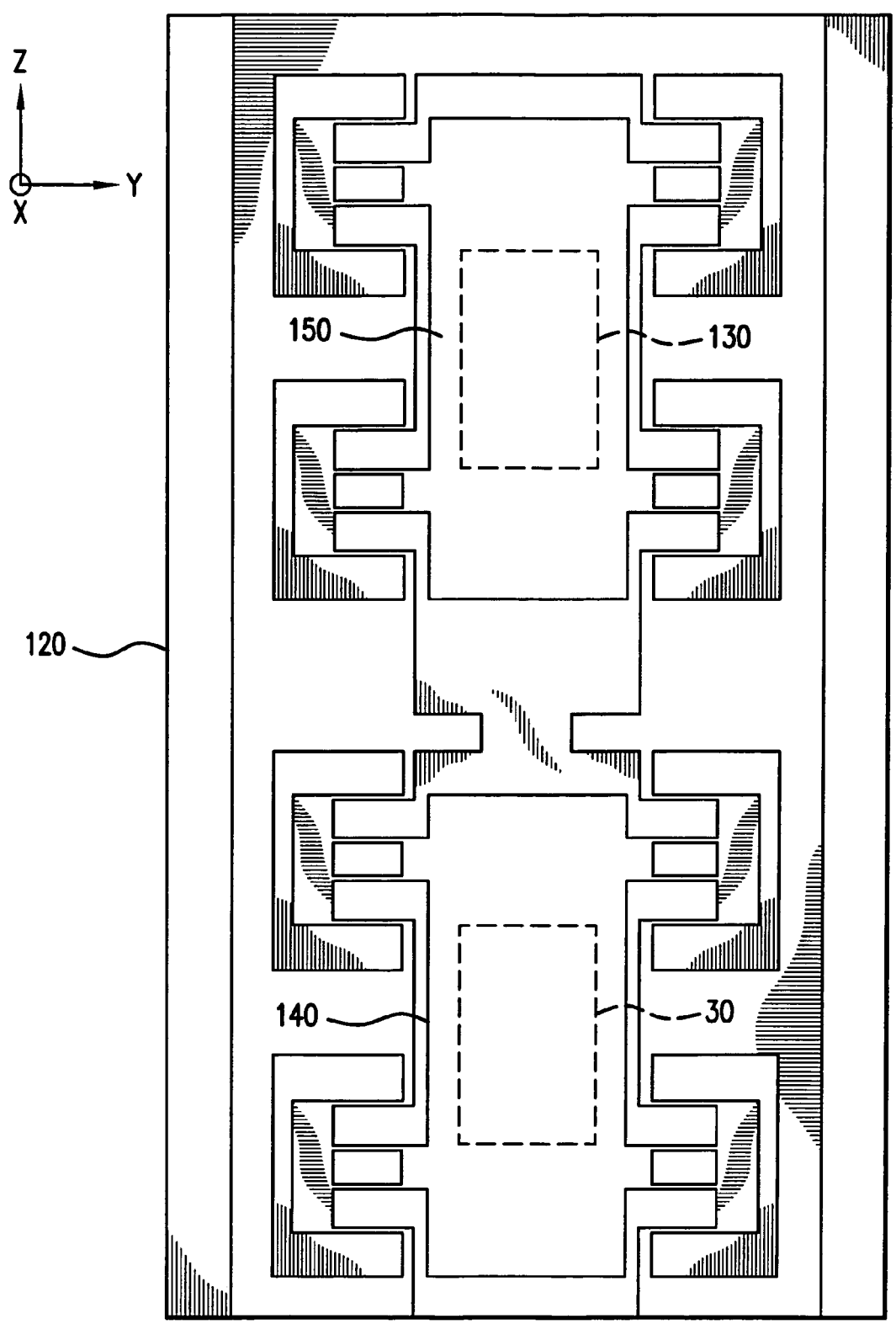
FIGS. 14 and 15 are top plan views of exemplary vibration isolating actuators that are alternatives to the actuator of FIG. 4.

In yet a further improvement to achieve even a faster slew rate, vibrations, that would normally result from the fast and sudden movement of scanning probe 6, are isolated with a structure of FIG. 14. When the structure of FIG. 14 is used as linear actuator 10 in the microscope of FIG. 1, two co-linear actuators 140, 150 are provided. Scanning probe 6 is mounted on mounting pad 30 of linear actuator 140, and a corresponding mass is mounted on mounting pad 130 of linear actuator 150. Alternatively, probe 6 may be mounted on mounting pad 130 and the corresponding mass may be mounted on mounting pad 30. Electrodes disposed between stator and translator of electrostatic surface actuators 140, 150 are configured so that when actuator 140 moves to the right, actuator 150 moves to the left, and vice versa. In this case actuator 150 does not help drive the probe, but it will reduce the inverse reaction force. Actuator 150 is loaded with a mass that matches the mass of probe 6 to better neutralize vibrations created by the motion actuator 140.

Figure 15:
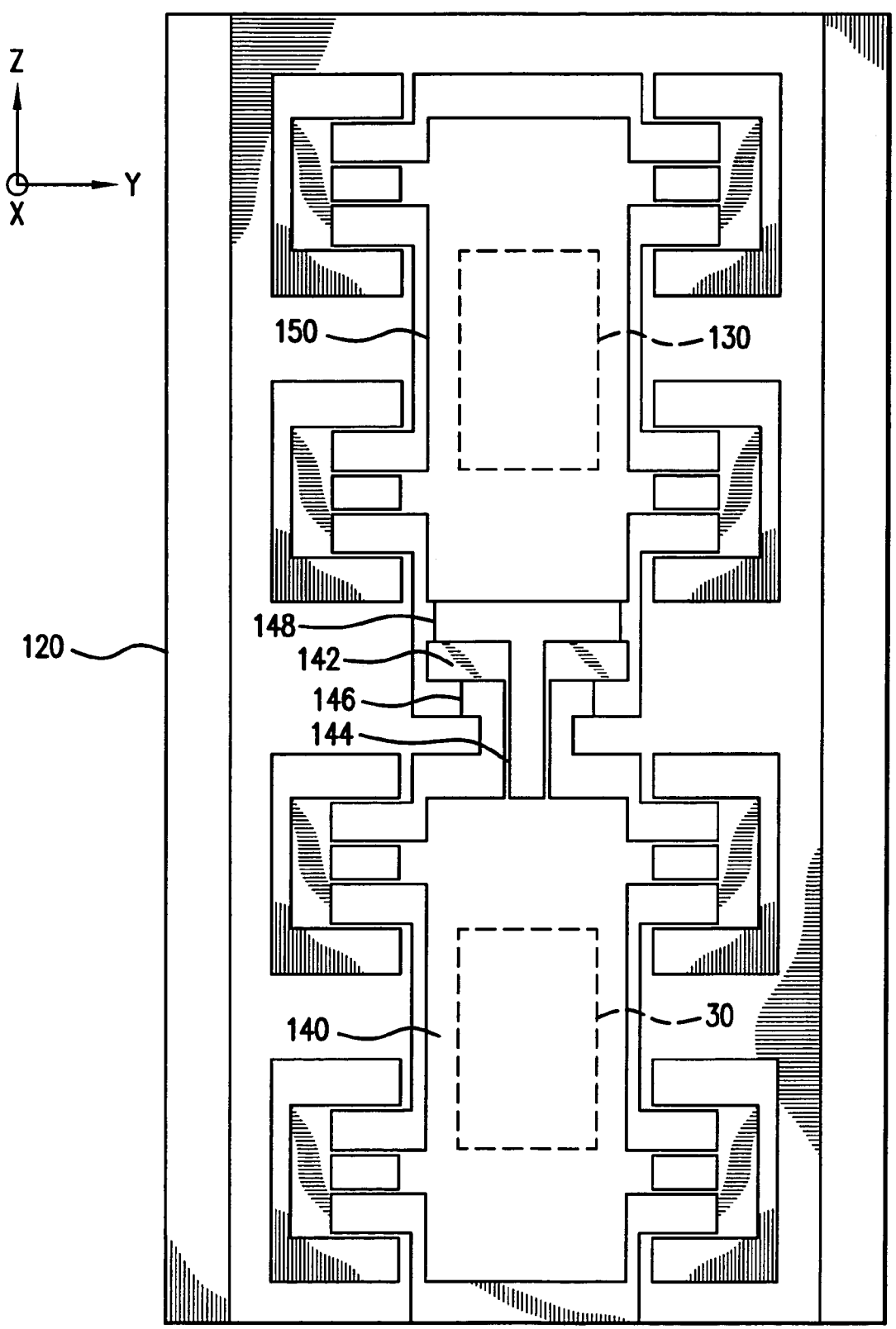

In an alternative improvement to achieve a faster slew rate, vibrations are isolated with a structure of FIG. 15. The embodiment of FIG. 15 differs from the embodiment of FIG. 14 in that the embodiment of FIG. 15 includes two direction reversing structures, each direction reversing structure including pivot arm 142 and pivot flexures 144, 146 and 148 and are similar to the pivot arm structures 134 discussed above with respect to FIG. 3. The translator 140 of this embodiment of actuator 10 is coupled to a first end of the pivot arm 142 through pivot flexure 144, and a rigid structure 120 is coupled to a fulcrum of pivot arm 142 through pivot flexure 146. The second end of pivot arm 142 is coupled through pivot flexure 148 to the translator 150. In this way, when translator 140 moves left, translator 150 will move right, and vice versa. The pivot flexures accommodate modest rotational movement about axes normal to the XY plane, but are stiff to permit translator 140 to push and pull on the first end of pivot arm 142 and permit the second end of pivot arm 142 to pull and push on the translator 150. By using the direction reversing structures, the embodiment of FIG. 15 needs to have drive electrodes under only one of the translators 140, 150 thus simplifying the drive electronics.

The embodiments of both FIGS. 14 and 15 use micromachined balanced actuators. By starting with a low mass electrostatic surface actuator, the embodiments of FIGS. 14 and 15 are able to achieve unsurpassed slew rates. Furthermore, the principles of vibration isolation of the electrostatic surface actuator of FIG. 14 or 15 can be equally well applied to the electrostatic surface actuators of the embodiment of FIG. 12.

Figure 16:
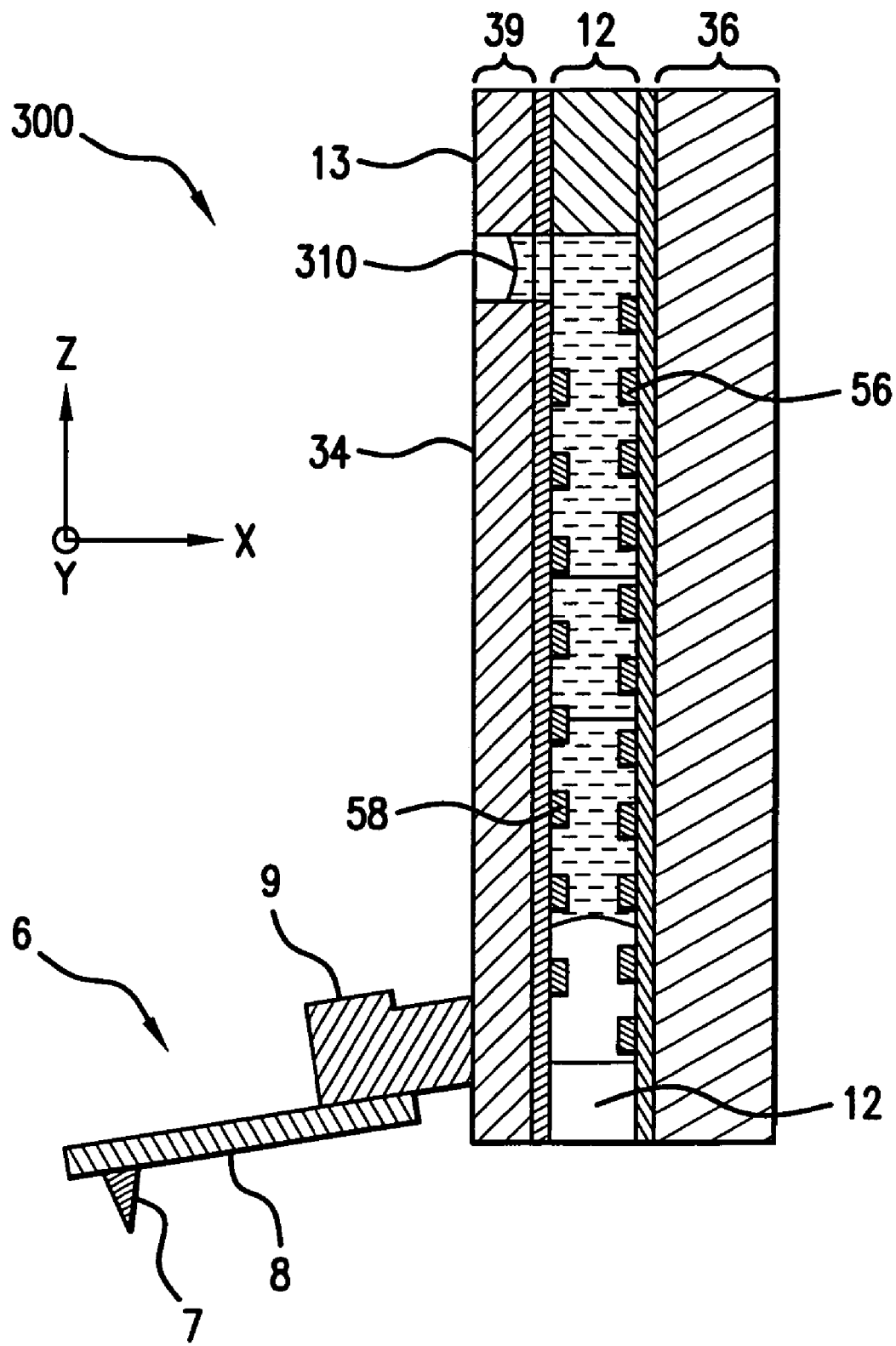
FIG. 16 is a schematic section view of the actuator of FIG. 4 in which a dielectric fluid has been introduced between the rotor and stator surfaces.

In some instances, it is desirable to operate Z actuator 10 in a humid or aqueous environment. Water, since it is a polar molecule, tends to shield the electrostatic potentials produced by the stator electrodes 56 and translator electrodes 58 and reduces the forces induced by the Z actuator 10. The embodiment 300 of FIG. 16 circumvents this problem by interposing a layer of dielectric fluid 310 between the translator 34 and stator 36. A suitable dielectric fluid is sold by the 3M company under the trade name FLUORINERT.

Transformer oils are also suitable; one such oil is sold by the Shell Oil Corporation under the trade name DIALA Oil M.

Figure 17:
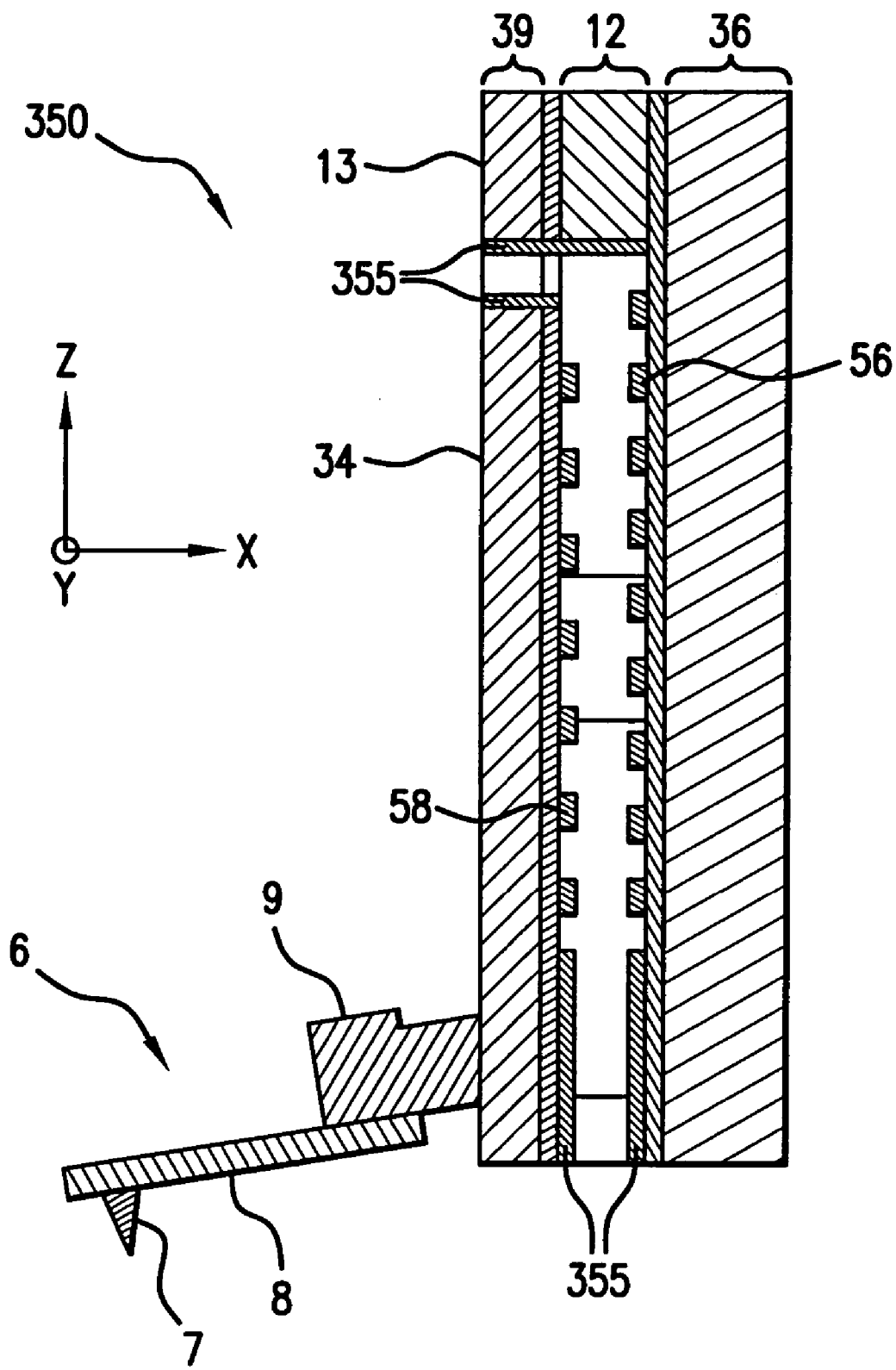
FIG. 17 is a schematic section view of the actuator of FIG. 4 in which the sidewalls of the structures have been coated with a hydrophobic coating.

A further embodiment 350 for protecting the electrodes from a water environment is shown in FIG. 17. In this case, a hydrophobic dielectric film 355 is coated on parts of the Z actuator 10 exterior to the stator electrodes 56 and translator electrodes 58. Because the gaps between the surfaces are very small, ranging from 100 microns to 1 micron, liquid water cannot traverse these regions and satisfactory operation of the Z actuator is achieved. Furthermore, the principles of isolating the electrodes from an aqueous environment shown in FIGS. 16 and 17 can be equally well applied to the electrostatic surface actuators of FIGS. 12, 14, and 15.

Figure 18:
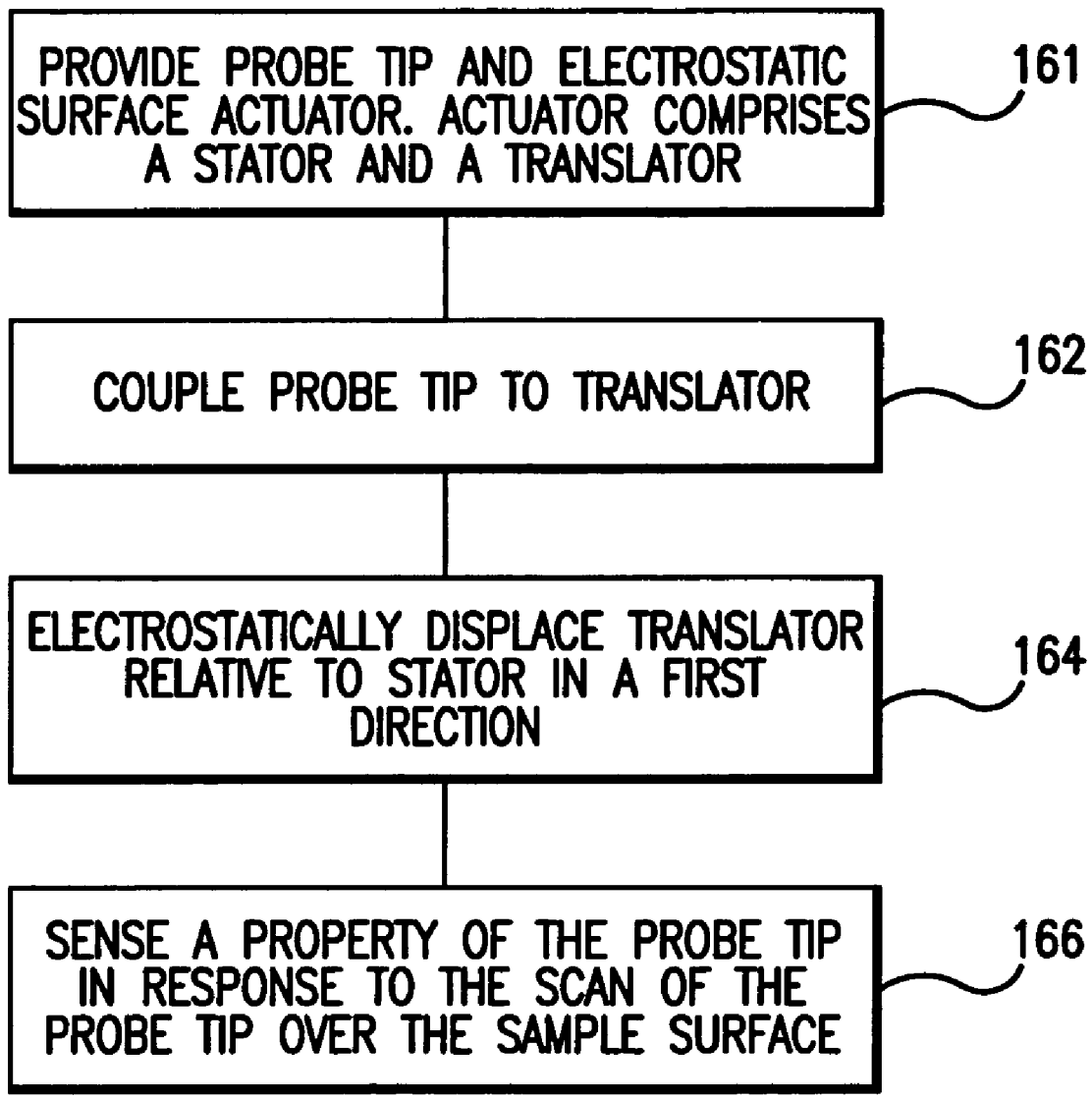
FIG. 18 is a flow chart showing a method of moving the probe tip according to the invention.

A method of scanning with a probe tip in accordance with the invention will be described with reference to FIG. 18. The method of scanning a sample uses a surface electrostatic actuator is illustrated in FIG. 18. Initially, at 161, a probe tip and an electrostatic surface actuator comprising a stator and a translator are provided. Then, at 162, a probe is mounted on a movable member of the surface electrostatic actuator. A surface of the movable member is generally disposed to face a surface of a stationary member of the surface electrostatic actuator. Then, at 164, the movable member is displaced in a direction generally parallel to the surface of the movable member. This scans the probe over the sample where the cantilever 8 flexes in response to the probe tip scanning over the surface. Additional responses of the tip are also possible depending on the method of scanning probe microscopy being used. For example, if the tip is a scanning tunneling microscope tip, then different currents will flow when a voltage is applied to cantilever 8. Alternatively, if the tip is a scanning thermal microscope tip, then the tip will exhibit increased or decreased heat loss in response to changes in the sample surface. Further responses of the tip will be apparent to one skilled in the art of scanning probe microscopy. At 166, a property (e.g., flexing, heat loss, differing currents, etc.) of the probe that is responsive to the scan of the probe over the sample is sensed. Conventionally, the displacement of the tip causes the flexure to bend and to change the position of a reflected beam of light. This method of sensing is shown in FIGS. 1 and 2. Another method of sensing the deflection of the tip is to detect a change of resistance of a piezoresistor that is incorporated on the flexure. Yet another method of sensing the deflection of the tip is to use a laser interferometer to detect deflections of the cantilever relative to a reference surface. As described above, the method of sensing could entail detecting a change in current flow through the tip or detecting a difference in heat loss through the tip.

Having described preferred embodiments of a novel scanning probe microscope using a surface drive actuator to position a scanning tip (which are intended to be illustrative and not limiting), it is noted that modifications and variations can be made in light of the above teachings. It is therefore to be understood that changes may be made in the particular embodiments of the invention disclosed which are within the scope of the invention as defined by the appended claims.

What is claimed is:

1. A scanning probe microscope comprising a scanning probe tip and an electrostatic surface actuator operatively coupled to the scanning probe tip, wherein;
   the electrostatic surface actuator includes a movable member that has a first surface and a stationary member that has a second surface;
   the movable member includes a first plurality of electrodes disposed on the first surface;
   the stationary member includes a second plurality of electrodes disposed on the second surface;
   the movable member is resiliently coupled to the stationary member so that the first and second surfaces are disposed in a confronting relationship and so that the movable member is capable of being displaced with respect to the stationary member in a first direction;
   the first and second electrodes are configured to generate electrostatic forces in response to voltages applied thereto, the electrostatic forces being aligned to displace the movable member in the first direction generally parallel to the first and second surfaces; and
   the movable member is mechanically attached to the scanning probe tip such that the scanning probe tip in controllably positioned by displacement of the movable member;
   wherein the voltage applied to one of said first plurality of electrodes differs from the voltage applied to at least one other of said first plurality of electrodes by a predetermined amount.

2. The microscope of claim 1, wherein the scanning probe tip includes at least one of:
   an atomic force microscope tip;
   a magnetic force microscope tip;
   a scanning tunneling microscope tip; and
   a scanning field emission tip.

3. A scanning probe microscope comprising a scanning probe tip and an electrostatic surface actuator operatively coupled to the scanning probe tip, wherein;
   the electrostatic surface actuator includes a movable member that has a first surface and a stationary member that has a second surface;
   the movable member includes first electrodes disposed on the first surface;
   the stationary member includes second electrodes disposed on the second surface;
   the movable member is resiliently coupled to the stationary member so that the first and second surfaces are disposed in a confronting relationship and so that the movable member is capable of being displaced with respect to the stationary member in a first direction;
   the first and second electrodes are configured to generate electrostatic forces in response to voltages applied thereto, the electrostatic forces being aligned to displace the movable member in the first direction generally parallel to the first and second surfaces;
   the movable member is mechanically attached to the scanning probe tip such that the scanning probe tip in controllably positioned by displacement of the movable member;
   the movable member constitutes a first movable member;
   the electrostatic surface actuator further includes a second movable member having a third surface;
   the second movable member further includes a third plurality of electrodes disposed on the third surface;
   the first movable member has a fourth surface and includes a fourth plurality of electrodes disposed on the fourth surface; and
   the third and fourth pluralities of electrodes are configured to generate electrostatic forces in response to voltages applied to the third and fourth plurality of electrodes, the electrostatic forces being aligned to laterally displace the movable member in a second direction generally orthogonal to the first direction and generally parallel to the first and second surfaces.

4. The microscope of claim 3, wherein:
   the first movable member includes a first plurality of flexures that are attached to the stationary member;
   the flexures of the first plurality of flexures have a structural property to resiliently yield to movement of the first movable member relative to the stationary member such that the first movable member may be displaced relative to the stationary member in the first direction;
   the second movable member includes a second plurality of flexures that are attached to the first movable member; and
   the flexures of the second plurality of flexures have a structural property to resiliently yield to movement of the second movable member relative to the first movable member such that the second movable member may be displaced relative to the first movable member in the second direction.

5. The microscope of claim 4, wherein the scanning probe tip includes at least one of:
   an atomic force microscope tip;
   a magnetic force microscope tip;
   a scanning tunneling microscope tip; and
   a scanning field emission tip.

6. The microscope of claim 3, further comprising a piezoelectric actuator, wherein;
   the piezoelectric actuator is disposed with respect to the electrostatic surface actuator so that the piezoelectric actuator is movable in a third direction, the third direction being generally orthogonal to both the first and second directions.

7. The microscope of claim 6, wherein the scanning probe tip includes at least one of:
   an atomic force microscope tip;
   a magnetic force microscope tip;
   a scanning tunneling microscope tip; and
   a scanning field emission tip.

8. A scanning probe microscope comprising a scanning probe tip and an electrostatic surface actuator operatively coupled to the scanning probe tip, wherein:
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member;
further comprising a two-dimensional actuator, wherein:
the two-dimensionally actuator is capable of displacing a mounting stage in each of a second direction and a third direction;
the second and third directions are generally orthogonal; and
the electrostatic surface actuator is mounted on the mounting stage so that the first direction is defined normal to a plane of the second and third directions.

9. The microscope of claim 8, wherein the two-dimensional actuator is one of a two-dimensional piezoelectric actuator and a two-dimensional electrostatic surface actuator.

10. The microscope of claim 8, wherein:
the scanning probe tip includes a cantilever, and
the cantilever is inclined with respect to the plane of the second and third directions by an offset angle sufficient to ensure that a clearance is maintained between the electrostatic surface actuator and a sample to be measured.

11. The microscope of claim 10, wherein the offset angle is greater than 0 degrees and less than or equal to 10 degrees.

12. A scanning probe microscope comprising a scanning probe tip and an electrostatic surface actuator operatively coupled to the scanning probe tip, wherein:
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member; and
wherein the first electrodes are positioned on the first surface of the movable member such that a repeat distance associated with the first electrodes divided by a gap distance between the first electrodes and the second electrodes is less than approximately sixteen.

13. A scanning probe microscope comprising a scanning probe tip and an electrostatic surface actuator operatively coupled to the scanning probe tip, wherein;
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member; and
wherein:
the electrodes of the first electrodes are thin strips of conductive material that are positioned substantially in parallel with each other on the first surface;
the electrodes of the second electrodes are thin strips of conductive material that are positioned substantially in parallel with each other on the second surface and
a first electrode of the first electrodes is positioned substantially in parallel with a first electrode of the second electrodes.

14. A scanning probe microscope comprising a scanning probe tip and an electrostatic surface actuator operatively coupled to the scanning probe tip, wherein;
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member; and further comprising a voltage controller, wherein:
the voltage controller is electrically coupled to the second electrodes
the voltage controller is capable of selectively providing voltages to the second electrodes that vary along the second electrodes such that predetermined voltage patterns are established; and
the predetermined voltage patterns define the electrostatic forces between the movable member and the stationary member.

15. The microscope of claim 14, further comprising a voltage source, wherein:
the voltage source is electrically coupled to the first electrodes; and
the voltage source is configured to apply a repeating spatially alternating voltage pattern to the first electrodes.

16. A scanning probe microscope comprising a scanning probe tip and an electrostatic surface actuator operatively coupled to the scanning probe tip, wherein;
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member;
further comprising a voltage source, wherein:
the voltage source is electrically coupled to the first electrodes; and
the voltage source is configured to apply a repeating spatially alternating voltage pattern to the first electrodes.

17. The microscope of claim 1, wherein:
the movable member includes a plurality of flexures that are attached to the stationary memory; and
the flexures have a structural property to yield to movement of the movable member such that the movable member may be displaced in the first direction.

18. A scanning probe microscope comprising a scanning probe tip and an electrostatic surface actuator operatively coupled to the scanning probe tip, wherein;
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member;
further comprising dielectric fluid disposed between the first and second surfaces.

19. A scanning probe microscope comprising a scanning probe tip and an electrostatic surface actuator operatively coupled to the scanning probe tip, wherein;
the electrostatic surface actuator includes a movable member that has a first surface and a stationary member that has a second surface;
the movable member includes first electrodes disposed on the first surface;
the stationary member includes second electrodes disposed on the second surface;
the movable member is resiliently coupled to the stationary member so that the first and second surfaces are disposed in a confronting relationship and so that the movable member is capable of being displaced with respect to the stationary member in a first direction;
the first and second electrodes are configured to generate electrostatic forces in response to voltages applied thereto, the electrostatic forces being aligned to displace the movable member in the first direction generally parallel to the first and second surfaces; and
the movable member is mechanically attached to the scanning probe tip such that the scanning probe tip in controllably positioned by displacement of the movable member;
further comprising:
a first hydrophobic dielectric film disposed on the movable member; and
a second hydrophobic dielectric film disposed on the stationary memory.

20. A method of scanning a sample using a surface electrostatic actuator, the method comprising:
mounting a probe on a movable member of the surface electrostatic actuator having a plurality of electrodes;
displacing the movable member relative to a stationary member in a direction generally parallel to the surface of the movable member to scan the probe over the sample by applying voltages to said electrodes, wherein the voltage applied to one of said plurality of electrodes differs from the voltage applied to at least one other of said plurality of electrodes by a predetermined amount;
sensing a property of the probe in responsive to the scan of the probe over the sample.

21. The method of claim 20, further comprising displacing the movable member in a second direction generally orthogonal to the first direction and generally parallel to the surface of the movable member.

22. The method of claim 21, further comprising displacing the movable member in a third direction generally orthogonal to both the first and second directions.

23. The method of claim 20, further comprising displacing the electrostatic surface actuator within a plane, wherein a cantilever of the probe tip is inclined with respect to the plane by an offset angle sufficient to ensure that a clearance is maintained between he electrostatic surface actuator and the sample.

24. The method of claim 23, further comprising displacing the movable member in a second direction generally orthogonal to the first direction and generally parallel to the surface of the movable member.

* * * * *

UNITED STATES PATENT AND TRADEMARK OFFICE
CERTIFICATE OF CORRECTION

PATENT NO. : 7,372,025 B2
APPLICATION NO. : 11/291671
DATED : May 13, 2008
INVENTOR(S) : Hoen et al.

It is certified that error appears in the above-identified patent and that said Letters Patent is hereby corrected as shown below:

On the Title page, in field (57), under "Abstract", in column 2, line 9, after "relationship" insert --.--.

In column 13, line 45, in Claim 1, delete "in" and insert --is-- therefor.

In column 14, line 12, in Claim 3, delete "in" and insert --is-- therefor.

In column 15, line 22, in Claim 8, delete "in" and insert --is-- therefor.

In column 16, line 2, in Claim 12, delete "in" and insert --is-- therefor.

In column 16, line 31, in Claim 13, delete "in" and insert --is-- therefor.

In column 16, line 65, in Claim 14, delete "in" and insert --is-- therefor.

In column 17, line 3, in Claim 14, after "electrodes" insert --;--.

In column 17, line 39, in Claim 16, delete "in" and insert --is-- therefor.

In column 17, line 51, in Claim 17, after "stationary" delete "memory;" and insert --member;--, therefor.

In column 18, line 9, in Claim 18, delete "in" and insert --is-- therefor.

UNITED STATES PATENT AND TRADEMARK OFFICE
CERTIFICATE OF CORRECTION

PATENT NO. : 7,372,025 B2
APPLICATION NO. : 11/291671
DATED : May 13, 2008
INVENTOR(S) : Hoen et al.

It is certified that error appears in the above-identified patent and that said Letters Patent is hereby corrected as shown below:

In column 18, line 36, in Claim 19, delete "in" and insert --is-- therefor.

In column 18, line 43, in Claim 19, after "stationary" delete "memory." and insert --member.--, therefor.

In column 19, line 2, in Claim 23, delete "he" and insert --the--, therefor.

Signed and Sealed this

Second Day of September, 2008

JON W. DUDAS
*Director of the United States Patent and Trademark Office*